(12) United States Patent
Narasimhan et al.

(10) Patent No.: US 11,580,526 B2
(45) Date of Patent: Feb. 14, 2023

(54) ELECTRONIC IDENTIFICATION AND AUTHENTICATION SYSTEM

(71) Applicant: PAYPAL, INC., San Jose, CA (US)

(72) Inventors: Srivathsan Narasimhan, San Jose, CA (US); Eric Byungho Min, San Jose, CA (US); Michael Charles Todasco, Santa Clara, CA (US); Cheng Tian, San Jose, CA (US); Satish Narayan Govindarajan, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 558 days.

(21) Appl. No.: 16/725,507

(22) Filed: Dec. 23, 2019

(65) Prior Publication Data
US 2020/0210992 A1 Jul. 2, 2020

Related U.S. Application Data

(63) Continuation of application No. 15/394,252, filed on Dec. 29, 2016, now Pat. No. 10,515,353.

(51) Int. Cl.
*G06Q 20/32* (2012.01)
*G06Q 20/20* (2012.01)
*G06Q 20/40* (2012.01)

(52) U.S. Cl.
CPC ......... *G06Q 20/3278* (2013.01); *G06Q 20/20* (2013.01); *G06Q 20/4014* (2013.01)

(58) Field of Classification Search
CPC . G06Q 20/3278; G06Q 20/20; G06Q 20/4014
See application file for complete search history.

(56) References Cited

U.S. PATENT DOCUMENTS 7,494,067 B1 2/2009 Zhu
7,512,567 B2 3/2009 Bemmel et al.
(Continued)

FOREIGN PATENT DOCUMENTS

WO WO2013056104 4/2013

OTHER PUBLICATIONS

Manvi, Sunil S., Lokesh B. Bhajantri, and M. A. Vijayakumar. "Secure mobile payment system in wireless environment." 2009 International Conference on Future Computer and Communication. IEEE, 2009. (Year: 2009).*
(Continued)

*Primary Examiner* — Nathan A Mitchell
(74) *Attorney, Agent, or Firm* — Haynes and Boone, LLP

(57) ABSTRACT

A system includes a service provider device and a point of sale (POS) device. A session between a user device and the POS device is established. An authentication request associated with the user device is provided via a user interface of the POS device. Subsequent to an authentication of information, responsive to the authentication request, the POS device receives funding instrument (FI) proxy information corresponding to FIs, which is unusable to identify the FIs by a merchant. A selectable representation corresponding to the FI proxy information is provided via the user interface. Responsive to receiving an indication of a selected member from the selectable representation, information for the selected member is sent. The service provider device determines that the session corresponds to an account associated with the user device and the merchant, and performs a transaction for the session using a first FI that corresponds to the selected member.

20 Claims, 16 Drawing Sheets

(56) References Cited

U.S. PATENT DOCUMENTS

| | | | |
|---|---|---|---|
| 8,566,168 B1 | 10/2013 | Bierbaum et al. | |
| 8,793,776 B1* | 7/2014 | Jackson | H04W 4/021 |
| | | | 726/7 |
| 8,972,296 B2 | 3/2015 | Govindarajan et al. | |
| 9,355,533 B2 | 5/2016 | Govindarajan et al. | |
| 10,990,966 B1* | 4/2021 | Ellis | G06Q 20/363 |
| 11,037,139 B1* | 6/2021 | Ho | G06Q 20/3263 |
| 11,222,334 B2* | 1/2022 | Sharma | G06Q 20/4014 |
| 2001/0029498 A1 | 10/2001 | Tomoike | |
| 2009/0043702 A1 | 2/2009 | Bennett | |
| 2009/0063312 A1* | 3/2009 | Hurst | G06Q 20/40 |
| | | | 705/41 |
| 2009/0210308 A1 | 8/2009 | Toomer et al. | |
| 2010/0153269 A1 | 6/2010 | McCabe | |
| 2010/0320266 A1 | 12/2010 | White | |
| 2011/0112920 A1* | 5/2011 | Mestre | G06Q 20/40 |
| | | | 705/17 |
| 2011/0246317 A1 | 10/2011 | Coppinger | |
| 2011/0251892 A1* | 10/2011 | Laracey | G06Q 20/20 |
| | | | 705/16 |
| 2011/0320345 A1 | 12/2011 | Taveau et al. | |
| 2012/0259768 A1 | 10/2012 | Mukherjee | |
| 2013/0103513 A1 | 4/2013 | Fisher | |
| 2013/0110728 A1 | 5/2013 | Kobres | |
| 2013/0200999 A1 | 8/2013 | Spodak et al. | |
| 2013/0238455 A1* | 9/2013 | Laracey | G06Q 30/0253 |
| | | | 705/21 |
| 2014/0019277 A1 | 1/2014 | Lindsey et al. | |
| 2014/0149293 A1* | 5/2014 | Laracey | G06Q 20/108 |
| | | | 705/44 |
| 2014/0279113 A1* | 9/2014 | Balasubramanian | |
| | | | G06Q 20/3224 |
| | | | 705/21 |
| 2015/0006386 A1* | 1/2015 | Tebbe | G06Q 20/3274 |
| | | | 705/44 |
| 2015/0088674 A1* | 3/2015 | Flurscheim | G06Q 20/326 |
| | | | 705/17 |
| 2015/0112822 A1* | 4/2015 | Aaron | G06Q 20/3572 |
| | | | 705/17 |
| 2015/0302398 A1 | 10/2015 | Desai et al. | |
| 2015/0324766 A1 | 11/2015 | Park et al. | |
| 2015/0332264 A1* | 11/2015 | Bondesen | G06Q 20/3821 |
| | | | 705/44 |
| 2016/0027013 A1 | 1/2016 | Modi | |
| 2016/0210612 A1 | 7/2016 | Tervo et al. | |
| 2016/0275506 A1* | 9/2016 | Salian | G06Q 20/325 |
| 2016/0337334 A1* | 11/2016 | Mu | H04L 63/0853 |
| 2016/0364701 A1* | 12/2016 | Nayfack | G06Q 20/0855 |
| 2016/0364716 A1* | 12/2016 | Bakshi | G06Q 20/3224 |
| 2017/0046706 A1* | 2/2017 | Agarwal | G06Q 20/4016 |
| 2017/0053301 A1 | 2/2017 | Khan et al. | |
| 2017/0270510 A1* | 9/2017 | Kattimani | H04W 4/023 |
| 2017/0352034 A1* | 12/2017 | Yu | G06Q 20/0855 |
| 2018/0047023 A1 | 2/2018 | Bouda | |
| 2018/0053157 A1 | 2/2018 | Roffey | |
| 2018/0144329 A1 | 5/2018 | Finch et al. | |
| 2018/0150816 A1 | 5/2018 | Liu et al. | |
| 2018/0240110 A1 | 8/2018 | Smets et al. | |
| 2018/0253718 A1* | 9/2018 | Khan | G06Q 20/326 |
| 2018/0276652 A1 | 9/2018 | Sofronas | |
| 2020/0013054 A1* | 1/2020 | Upadhye | G07F 7/1008 |

OTHER PUBLICATIONS

"Proximity Mobile Payments: Leveraging NFC and the Contactless Financial Payments Infrastructure". A Smart Card Alliance Contactless Payments Council White Paper. Smart Card Alliance, Sep. 2007. (Year: 2007).*

Ceipidor et al. "KerNeeS: A protocol for mutual authentication between NFC phones and POS terminals for secure payment transactions," 2012 9th International ISC Conference on Information Security and Cryptology, 2012, pp. 115-120. (Year: 2012).*

Arnfield, Robin. "Mobile w allets reshaping payments industry branding." Retrieved from <https://w w w.mobilepaymentstoday.com/ articles/mobile-w allets-reshaping-payments-industry-branding/> on Mar. 17, 2019. Originally published Aug. 2013.

"Security of Proximity Mobile Payments". Smart Card Alliance. May 2009.

Geuss, Megan. "How Apple Pay and Google Wallet actually work". Retrieved from <https://arstechnica.com/gadgets/2014/10/ how-mobile-payments-really-w ork/> on Mar. 17, 2019. Originally published Oct. 2014.

Arnfield, Robin. "Mobile Wallets 101", Mobilepaymentstoday.com. 2015.

"The Evolution of Digital and Mobile Wallets" Retrieved from <https://w w w.paymentscardsandmobile.com/wp-content/uploads/ 2016/10/The-Evolution-of-Digital-and-Mobile-Wallets.pdf>. Oct. 2016.

"The Winning Mobile Wallet Solution." Nacha. Retrieved from <https://w w w.nacha.org/systenVfiles/resources/NACHA_ eWalletWP Companion_FINAL.pdf>. 2016.

* cited by examiner

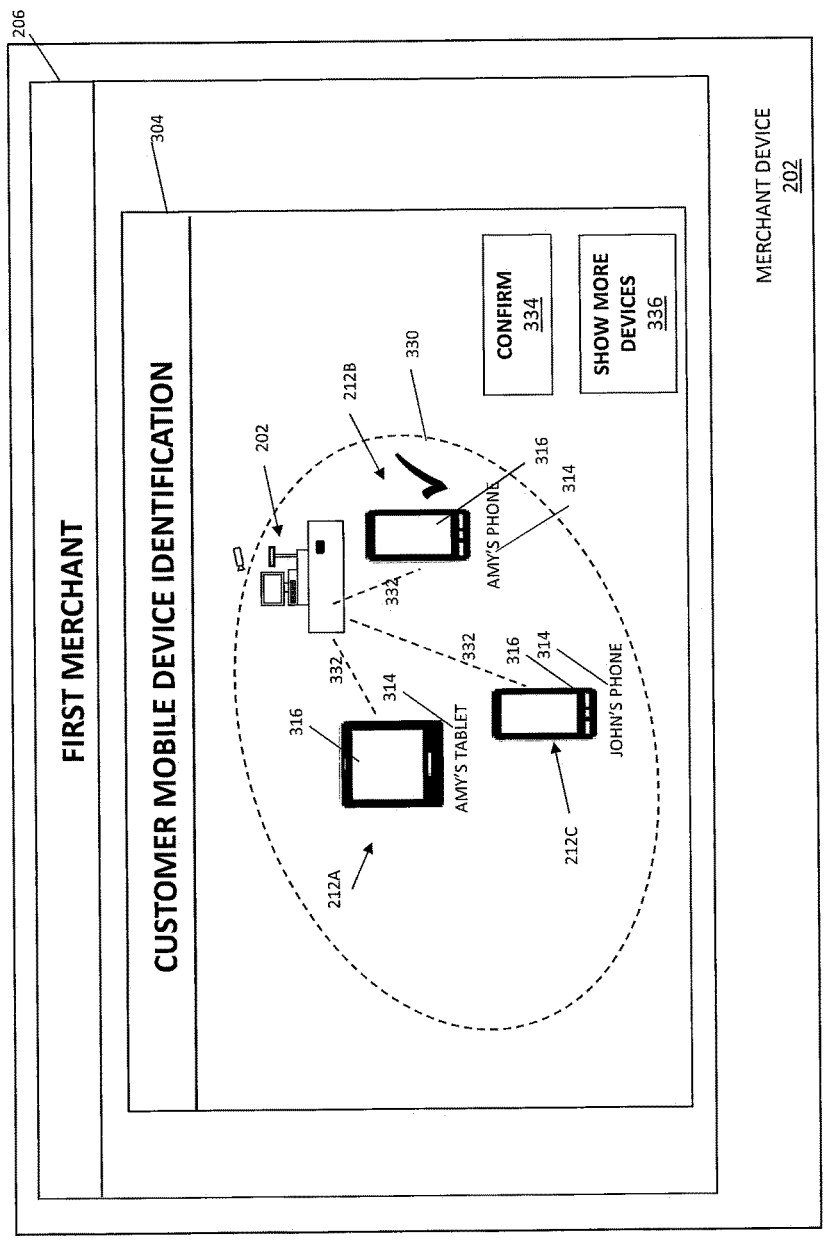

SYSTEM PROVIDER 402

FUNDING INSTRUMENT (FI) PRESENTATION CONFIGURATIONS 602

| TRUST LEVEL 612 | | FI INFO TYPES | | | |
|---|---|---|---|---|---|
| | | BANK CARD | CREDIT CARD | STORE CARD | COUPON |
| HIGH | | BANK NAME; LAST FOUR DIGITS | CARD NUMBER; EXPIRATION DATE | CARD NUMBER; EXPIRATION DATE | COUPON IMAGE ←604 |
| MEDIUM | | BANK NAME; BANK LOGO | PURCHASE CATEGORY; CATEGORY IMAGE | CARD IMAGE | COUPON IMAGE ←606 |
| LOW | MERCHANT DEVICE | INDEX IDENTIFIER | INDEX IDENTIFIER | INDEX IDENTIFIER | INDEX IDNETIFIER ←610A ⎫ 608 |
| | WERABLE DEVICE | BANK NAME | CARD IMAGE | CARD IMAGE | COUPON IMAGE ←610B ⎭ |

SYSTEM PROVIDER DEVICE 400

FIGURE 6

ELECTRONIC IDENTIFICATION AND AUTHENTICATION SYSTEM

RELATED APPLICATIONS

This application is a continuation of Ser. No. 15/394,252, filed Dec. 29, 2016, all of which is incorporated herein by reference in its entirety.

BACKGROUND

The present disclosure generally relates to electronic identification and authentication, and more particularly to a location-based electronic identification and authentication system that performs electronic identification and authentication of devices to enable secure electronic mobile transactions.

More and more consumers are conducting electronic transactions, such as purchasing items and services, via computing devices over electronic networks such as, for example, the Internet. Consumers routinely purchase products and services from merchants and individuals alike. The transactions may take place directly between a physical or on-line merchant or retailer and the consumer, and payment is typically made by entering credit card or other funding source information. Transactions may also take place with the aid of an on-line or mobile service provider such as, for example, PayPal, Inc. of San Jose, Calif. Such service providers can make transactions easier and safer for the parties involved. Purchasing with the assistance of a service provider from the convenience of virtually anywhere using a mobile device is one main reason why on-line and mobile purchases are growing very quickly.

Utilizing advances in mobile transaction technology, customers may now pay for a good or service at a point of sale (POS) device of a physical merchant using their smartphones, tablets, laptop computers, and/or other personal mobile computing devices. However, such conventional mobile transaction systems have drawbacks and inconvenient features that have impeded their adoption by both customers and merchants. For example, check-in or set-up procedures typically must be conducted at the POS device to identify and authenticate the customer, and often require the customer to take their mobile device out of their pocket or bag when they approach the POS device, and input information into the mobile device in order to enable a payment to the merchant, which can be time-consuming and inconvenient for both the customer and the merchant. In another example, the check-in or set-up procedures at the POS device typically result in the provisioning of sensitive information including, for example, payment account identifiers and/or other payment account information, customer names, customer telephone numbers, customer email addresses, customer physical addresses, and/or other types of sensitive information to the merchant device and/or the display of that sensitive information on a display device, which raises security concerns associated with that sensitive information being captured via, for example, the display device or a data breach at the merchant system.

Thus, applicants recognize that there is a need for improvements to electronic identification and authentication that address the issues detailed above.

BRIEF DESCRIPTION OF THE FIGURES

FIG. 3B illustrates an embodiment of a merchant device displaying a customer device identification screen;

FIG. 6 illustrates an embodiment of a system provider device displaying a funding instrument presentation configuration screen;

Figure 1:
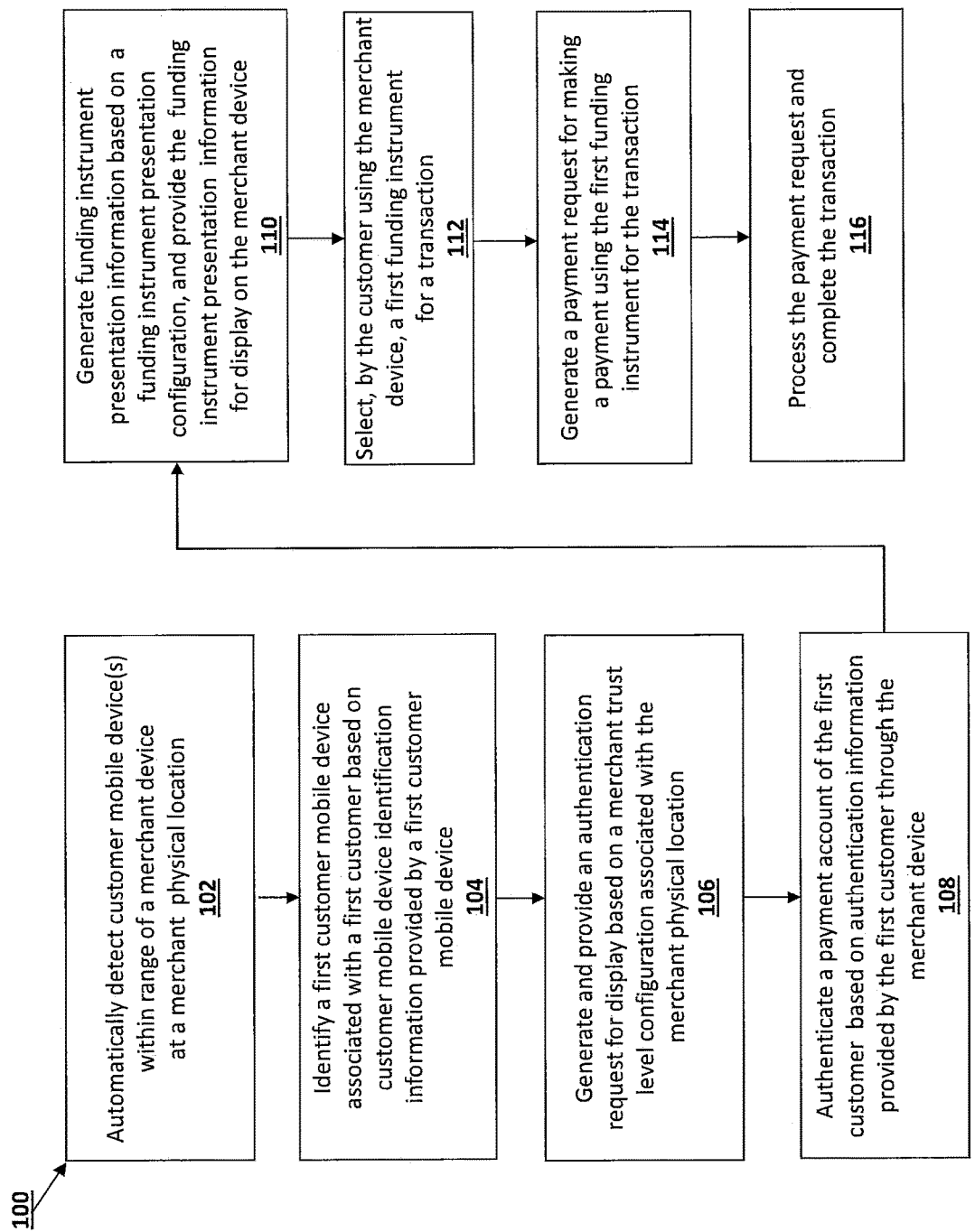
FIG. 1 is a flow chart illustrating an embodiment of a method for electronic identification and authentication.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing electronic identification and authentication that allow customer mobile devices to facilitate electronic transactions with a POS device at a merchant physical location. As discussed above, conventional mobile device transaction systems provided by merchants require customers to take their mobile devices out of their pocket or bag at a POS device in order to conduct a transaction with the merchant, which is inconvenient for the customer and can result in the customer foregoing the services offered by the mobile device system and using a conventional funding source, such as a credit or debit card. Furthermore, some conventional transaction systems, including mobile device transaction systems, expose sensitive customer information to security and privacy risks by providing that information to a merchant system and/or displaying that information at the POS device, which can result in that information being compromised by a third party. Moreover, customers' habits of using their physical wallets to conduct transactions may be difficult to change. Some customers may not think of conducting transactions with the merchant using their mobile devices, because those customers are so used to using their physical wallets to conduct the transactions.

Embodiments of the systems and methods described herein allow a merchant system to be used to change the customers' habit of using their physical wallets to conduct a transaction with the merchant. Customers may check in with the merchant system at the merchant physical location and make a mobile device payment via their mobile device without removing their mobile device from their pocket or bag, and without the need to perform any affirmative input or activity using their mobile device in order to conduct the mobile device transaction. In some embodiments, a customer may check in with the merchant system by providing a particular user device passcode to a POS device of the merchant system. The merchant system may use that particular user device passcode to establish an in-store session with the customer's mobile device (e.g., through a short-range communication protocol or a network protocol). However, in some embodiments, that particular user device passcode is not associated with the payment account of the customer provided by a system provider device, and may not be used to access that payment account of the customer. After establishing the in-store session with the customer mobile device, the POS device may send authentication information received from the customer to the customer mobile device, which may then send the authentication information to the system provider device. In such embodiments, the merchant system may not have possession of an account identifier (e.g., a user name) of that payment account of the customer, and therefore may not access that payment account of the customer without the presence of the customer mobile device at the merchant physical location. Upon receiving the authentication information provided by the customer through the POS device, the system provider device may perform an authentication process to authenticate that payment account based on authentication information and an account identifier provided by the customer mobile device. In an example, the authentication process includes confirming that that customer mobile device is located at the merchant physical location. After the payment account is authenticated, the system provider device may present funding instrument options to the customer through the POS device. Such funding instrument options may be presented to the customer without sending actual financial information of funding instruments to the merchant device. By providing to the merchant device funding instrument presentation information that does not include any sensitive information about the customer and/or actual financial information about the funding instruments, the customer is allowed to select a particular funding instrument for use in performing a transaction at the POS device based on the funding instrument presentation information. In such embodiments, because the POS device is not in possession of any actual financial information of that particular funding instrument, it may not withdraw funds from that particular funding instrument after that particular transaction. Thus, the security and privacy associated with that payment account of the customer including for example, the actual financial information of that particular funding instrument, is increased.

As discussed below, in some embodiments, the systems and methods of the present disclosure may be enabled by a system provider operating a system provider device. For example, an electronic transaction service provider such as PayPal, Inc. of San Jose, Calif., United States, that provides payment services for customers and/or merchants may operate as the system provider to perform the methods discussed below. As is also discussed below, such methods may be enabled by a mobile application (e.g., the PayPal™ application available from PayPal, Inc. of San Jose, Calif.) provided by the service provider to the customer for use on the customer mobile device. However, other providers (including the merchant) may enable the method with or without the service provider, and other application or computer-enabled functionality may be provided on the customer mobile devices and merchant devices to enable the method, while remaining within the scope of the present disclosure.

Referring to FIG. 1, an embodiment of a method 100 for providing electronic identification and authentication is illustrated. The method 100 may begin at block 102 where a merchant device included in a merchant system at a merchant physical location may automatically detect one or more user devices within a range of the merchant device. For example, the merchant system may include a POS device, and at block 102 the POS device may operate to detect user device(s) that are within range of a wireless communication subsystem of the POS device. In some embodiments, automatic detection may be performed using a wireless communication protocol (e.g., Wi-Fi, Bluetooth, infrared communication, acoustic-based communication, other near field communication). In some embodiments, detection may be based on actions performed by a user at the merchant device. In some embodiments, detection may be based on location data provided directly from the user device or from a different entity that provides the location of the user device. The merchant device may then display user device information associated with the detected user devices to a customer on a display subsystem of the merchant device such that a customer that is located near the merchant device and/or display subsystem may review the user device information.

Figure 2:
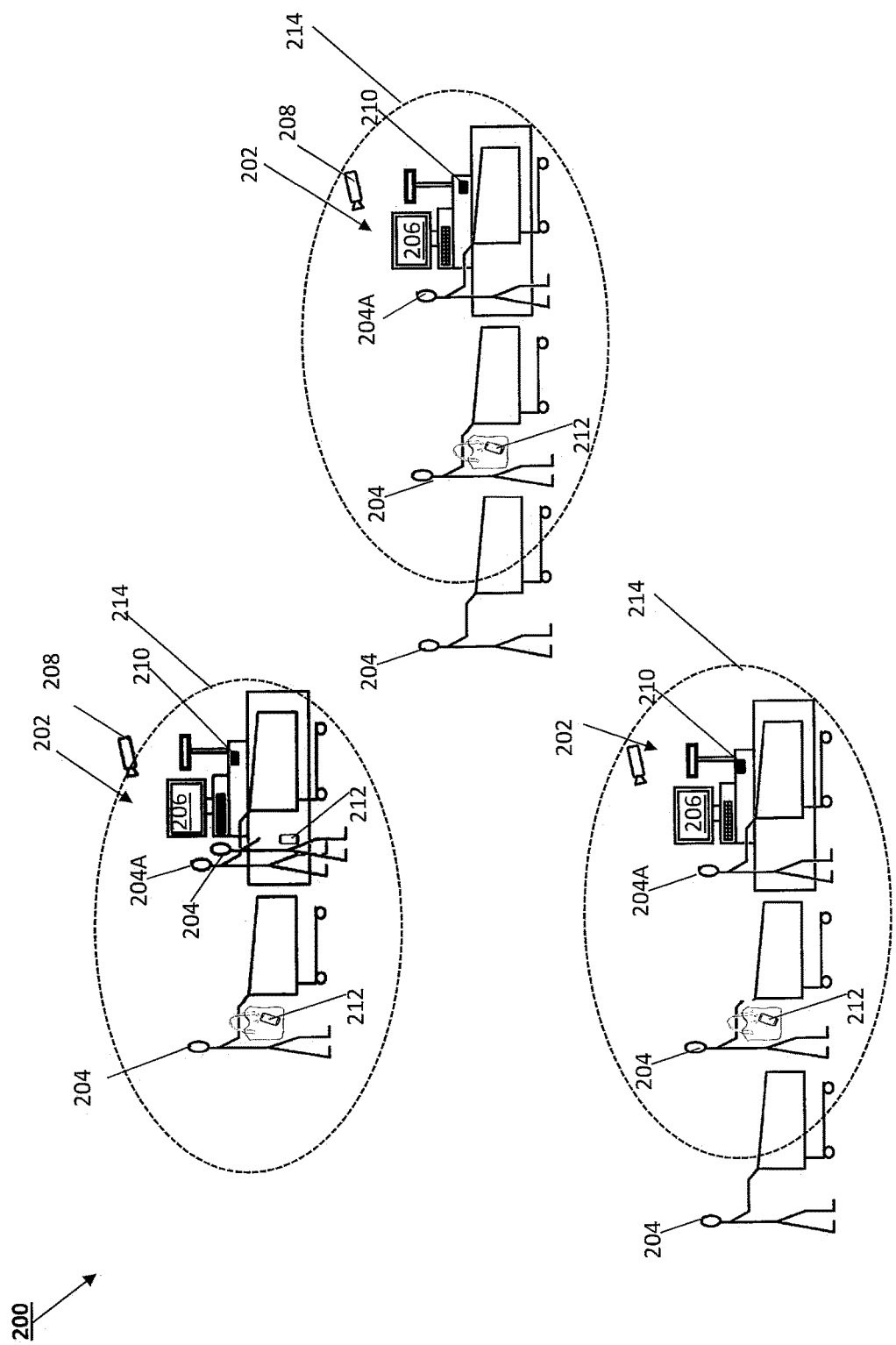
FIG. 2 is a block diagram illustrating an embodiment of a layout of a merchant physical location including a plurality of merchant devices.

Referring to FIG. 2, an embodiment of a layout of a merchant physical location 200 is illustrated. The merchant physical location 200 may include a plurality of merchant devices 202 (illustrated as the different POS devices). The merchant devices 202 may include card readers such as magnetic stripe readers, chip readers, etc., for reading conventional payment cards (e.g., bank cards, credit cards, and private label credit cards (PLCC or store cards)) and personal identification number (PIN) input systems which may be used to enter a PIN, a password, biometric information, etc. The merchant devices 202 may each also include display subsystems 206 such as, for example, touchscreen display subsystems (e.g., capacitive sensor touchscreen displays). In some examples, the merchant devices 202 may include barcode scanners that may be configured to scan or capture an image of a code printed on a product, and/or perform a lookup of the product based on the scanned code to determine information about the product (e.g., a price of the product). Payment transactions for products identified by the merchant devices 202 may be performed at the merchant devices 202 by engaging a card with the card reader (e.g., "swiping" or "tapping" the card), or using the merchant device 202 to instruct a payment service provider such as provided by PayPal, Inc. of San Jose, Calif., to transfer a payment to the merchant, as described in detail below.

In some embodiments, the merchant devices 202 may include an adjustable private screen (e.g., in addition to the display subsystem 206) that may be moved to face a customer 204A that is located near that merchant device 202. For example, the adjustable private screen may be configured such that other customers 204 (e.g., the customers 204 in the queue behind the customer that is nearest the merchant device 202) and/or an operator of the merchant device 202 may not view the customer's interactions with the private screen (e.g., providing an identification passcode, providing an authentication passcode, selecting a funding instrument to perform a payment transaction, and/or any of the other interactions discussed below).

In the example illustrated in FIG. 2, the merchant devices 202 include a camera 208 positioned to capture an image or video of the customers 204, and particularly the customer 204A that is located nearest the POS device provided in the merchant device 202, and as discussed below may be utilized to identify the customer 204A (e.g., by performing facial recognition techniques on an image of the customer 204A) for authentication. As such, the camera 208 may be provided with sufficient resolution such that images and/or video captured by the camera allow an image recognition subsystem to resolve facial features sufficiently to identify a particular customer from a database of customers.

In the illustrated example, merchant devices 202 include one or more communication devices or other wireless communication devices 210 that are configured to communicate with customer mobile devices 212, a system provider device, a payment service provider device, and/or other devices and/or subsystems discussed below. The locations of the merchant devices 202 may be configured based on the communication ranges of the communication devices 210. In an example, a distance between two neighboring merchant devices 202 may be greater than the communication ranges of the communication devices 210 on those two neighboring merchant devices 202. In some embodiments, the merchant devices 202 may use the wireless communication device 210 to receive customer mobile device information from the customer mobile devices 212 through a peer-to-peer communication protocol, a short-range communication protocol, a network protocol (e.g., one or more wireless networks telecommunications, mobile, and cellular phone networks), etc. The customer mobile device information may include a universally unique identifier ("UUID") associated with customer mobile device 212, a four-digit identity passcode (e.g., previously provided by the customer on the customer mobile device 212 or generated dynamically upon the customer mobile device 212 moving into a communication range of the merchant device 202), location data indicating the location of the customer mobile device 212 (e.g., provided by a Global Positioning System (GPS) in the customer mobile device 212), and/or other information that may be stored in the customer mobile device 212 and that would enable the functionality discussed below.

In some embodiments, the wireless communication device 210 may include a beacon subsystem and/or other wireless communication subsystems that are configured to broadcast Bluetooth low energy (BLE) signals (e.g., using a BLE beacon "dongle"), and one or more of the BLE signals broadcasted by the beacon subsystem may be detected by a customer mobile device 212 when the customer mobile device 212 moves within a mobile device detection range 214 of the wireless communication device 210. As such, the merchant devices 202 and the customer mobile devices 212 may perform low power BLE communications using a BLE device in the customer mobile devices 212 and the BLE beacon subsystem in the merchant device 202. As discussed below, such BLE communications may in some cases occur automatically and without the need for any affirmative action by the customers on the customer mobile devices 212 when at the merchant physical location using, for example, an application (e.g., a payment application such as, for example, the PayPal™ wallet application provided by PayPal, Inc. of San Jose, Calif., United States) on the customer mobile devices 212 that runs continuously, semi-continuously, or intermittently in an automated fashion in a "background" of the operating system on the customer mobile devices 212.

In some embodiments, the wireless communication device 210 may include a radio frequency identification (RFID) tag, a near-field communication (NFC) tag, and/or other relatively short range wireless communications subsystems known in the art. As such, the merchant devices 202 and the customer mobile devices 212 may perform short-range (e.g., RFID or NFC) communications using an RFID/NFC subsystem (e.g., a tag and/or reader) in the customer mobile device 212 and an RFID/NFC subsystem (e.g., a tag and/or reader) in the merchant devices 202.

In some embodiments, the communication process between the customer mobile devices 212 and the merchant devices 202 may take place on an unbounded channel provided via communications utilizing, for example, BLE protocols, RFID protocols, NFC protocols, and/or other wireless protocols known in the art. The inventors of the present disclosure have found that the use of an unbounded channel may provide greater speed and flexibility with regard to the wireless communications discussed below, but also may require precautions to ensure the protection of the sensitive information associated with the financial transactions (e.g., payment transactions) and/or other consumer transactions discussed below. For example, such precautions may include the communication of the customer mobile device information between the customer mobile devices 212 and the merchant devices 202 on the unbounded channel with UUIDs, identity passcodes, and/or other sensitive information in a generic fashion such that the details of that sensitive information are only known to the customer to which they apply and cannot be intercepted by other customers. In another example, such precautions may include the communication of the customer mobile device information between the customer mobile devices 212 and the merchant device 202 on the unbounded channel without including any sensitive information (e.g., payment account identifiers, names, telephone numbers, email addresses, credit card numbers, billing addresses, and/or other types of sensitive information) of the customer in the customer mobile device information.

As such, at block 102 of the method 100, the customers' mobile devices 212 within a wireless communication range of the merchant devices 212 may automatically wirelessly communicate customer mobile device information with the merchant devices 202, and the merchant devices 202 may use that customer mobile device information to automatically detect the customer mobile devices 212 at the merchant physical location. While specific embodiments of the merchant physical location, wireless communications, and/or other details of block 102 of the method have been provided above, one of skill in the art in possession of the present disclosure will recognize that the detection of the customer mobile devices at block 102 may be performed in a variety of manners that will fall within the scope of the present disclosure as well. For example, the detection of the customer mobile devices at block 102 may be performed using a variety of wireless technologies using a variety of network security protocols. For further example, the merchant devices 202 may include various readers (e.g., magnetic tag readers) that may detect tags (e.g., magnetic tags) in the customer mobile devices at block 102.

At block 104, a merchant device 202 identifies a customer mobile device 212 associated with a customer 204A based on the customer mobile device identification information provided by the customer 204A. As discussed below, the identification of the customer 204A may be used to perform a subsequent payment transaction at the POS device included in the merchant device 202. In some embodiments, it may be difficult for the merchant device 202 to automatically determine a particular customer mobile device 212 that the customer 204A would like to use. For example, as illustrated in FIG. 2, a plurality of different customers 204 waiting in line at the merchant device may each have a customer mobile device 212 and may each be positioned within the mobile device detection range 214 of the merchant device 202. As such, the automatic determination by the merchant device 202 of a particular customer mobile device 212 associated with the customer 204A that is ready to perform a payment transaction may be difficult. Furthermore, in some embodiments, a customer 204A that is nearest the POS device (and thus ready to perform a payment transaction that the POS device) may carry multiple customer mobile devices 212, making it difficult to automatically determine which of those customer mobile devices 212 the customer 204A would like to use.

Figure 3A:
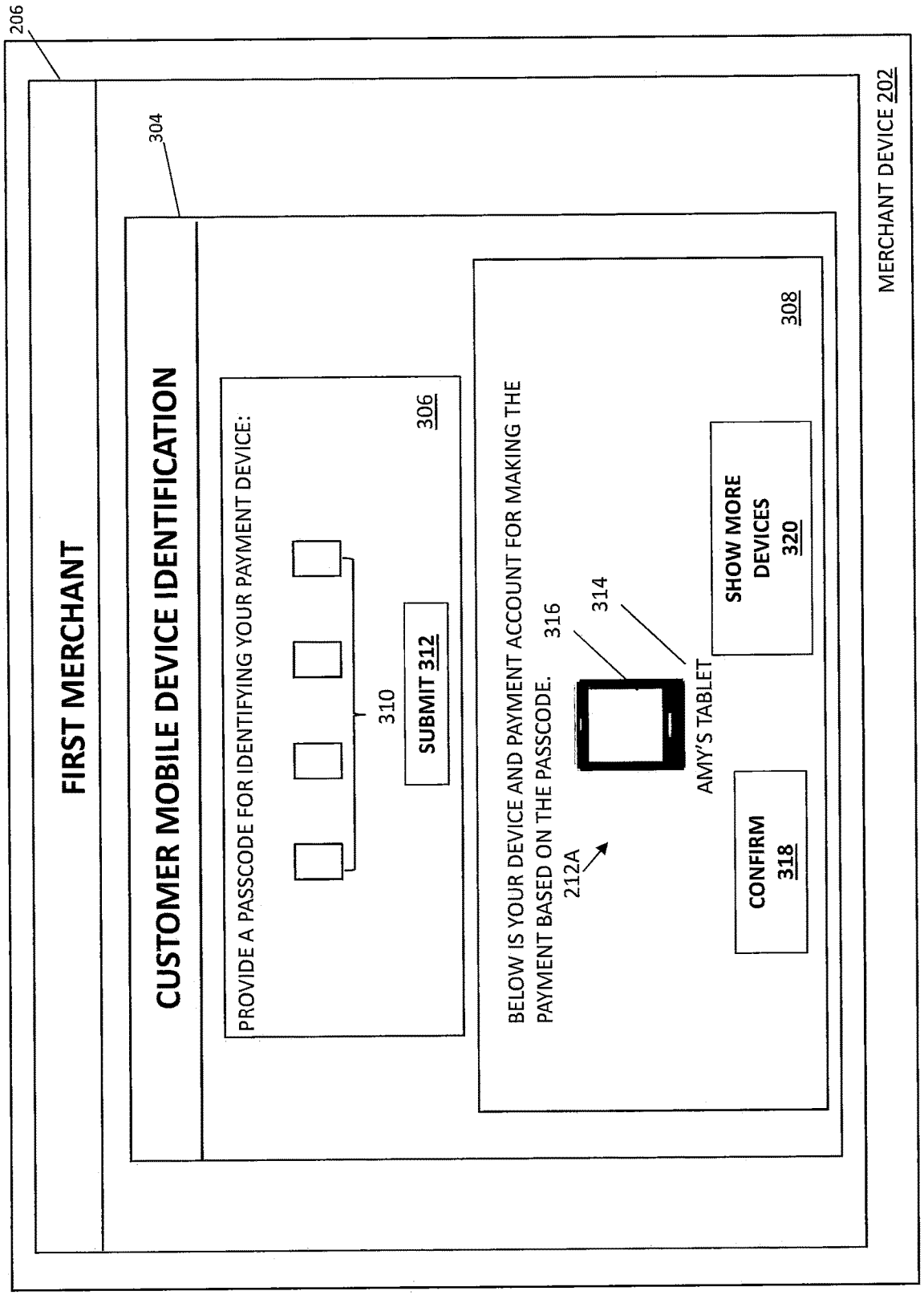
FIG. 3A illustrates an embodiment of a merchant device displaying a customer device identification screen.

With reference to FIGS. 3A and 3B, examples of customer mobile device determination screens are provided that may be used by various embodiments in the method 100 to automatically determine which of a plurality of customer mobile devices should be used in a payment transaction between a merchant and a customer are shown. In the illustrated examples, the customer mobile device may be identified based on customer mobile device identification information that is provided by the customer 204A to the merchant device 202. Referring first to FIG. 3A, in some examples, the customer mobile device identification information may include an identity passcode that is provided by the customer 204A using the merchant device 202. That identity passcode may be used to select a particular customer mobile device from a plurality of customer mobile devices that have been detected by the merchant device 202, which may be associated with that same customer 204A and/or different customers 204. In an example, that identity passcode is not associated with a payment account of the customer 204A, and may not be used to access a payment account of the customer 204A. In some examples, the customer mobile device identification information may include biometric characteristic(s) (e.g., a fingerprint, a voice, a face image, walking posture, standing posture, etc.) of the customer 204A that is captured by the merchant device 202. Those biometric characteristic(s) may be used to select particular customer mobile device(s) associated with that particular customer 204A from a plurality of customer mobile devices that have been detected by the merchant device 202, which may be associated with different customers 204.

FIG. 3A illustrates an embodiment of the merchant device 202 including the display subsystem 206 displaying a customer mobile device identification screen 304 that includes a customer mobile device identification passcode section 306 and a confirmation section 308. In an embodiment, the merchant device 202 may display the customer mobile device identification screen 304 following the detection of a plurality of customer mobile device 212 and, in some situations, the completion of a previous payment transaction. The customer mobile device identification passcode section 306 prompts the customer 204A to provide customer mobile device identification information associated with the customer mobile device that they would like to use, and the customer 204A may provide customer mobile device identification information (e.g., an identification passcode) using passcode fields 310 included in the customer mobile device identification passcode section 306. For example, the customer mobile device identification information provided by the customer 204A in the passcode fields 310 may be the same customer mobile device identification information that the customer 204A previously provided in their customer mobile device (e.g., via a payment application provided on the customer mobile device) to authorize or designate that customer mobile device 212 for use in payment transactions.

In another example, the customer mobile device identification information provided by the customer 204A in the passcode fields 310 may be customer mobile device identification information that was dynamically generated by a system provider upon the customer mobile device 212 being detected at the merchant physical location or within a customer payment range (e.g., about two feet) of the merchant device 202 that is indicative of the customer 204A being near the merchant device 202 and ready to perform a payment transaction. Such a customer payment range may be different from (e.g., less than) the mobile device detection range 214.

After automatically generating the customer mobile device identification information, the system provider device may then send the automatically generated customer mobile device identification information to the customer 204A through, for example, a wearable device associated with the customer 204A (e.g., via an audio message provided through headphones; a text message provided for a display on a watch, a head mounted display device, etc., and/or other wearable device communication technique that would be apparent to one of skill in the art in possession of the present disclosure). While in the illustrated example a four-digit passcode is provided as the customer mobile device identification information, the customer mobile device identification information may include an identifier that includes any number of any types of characters, as well as gesture-based identifiers, patterns, and/or other unique information that is known to the customer 204A. Following the provision of the customer mobile device identification information, the customer 204A may then select a submit button 312 to provide the customer mobile device identification information to the system provider device via the merchant device 202.

In the illustrated example, after receiving the customer mobile device identification information provided by the customer 204A through the customer mobile device identification passcode section 306 on the display subsystem 206 of the merchant device 202, the system provider device may identify a customer mobile device 212A selected by the customer 204A. As such, the system provider device may identify the customer mobile device 212A from a plurality of customer mobile devices 212 that were detected by the merchant device 202 in proximity of the merchant device 202 by matching the customer mobile device identification information provided by the customer 204A with information stored on the customer mobile device 212A and/or associated with the customer mobile device 212A in a database accessible to the system provider device.

In response to identifying the customer mobile device 212, the system provider device may provide that identification to the merchant device 202, and the merchant device 202 may provide the confirmation section 308 on the customer mobile device identification screen 304 that identifies the customer mobile device 212A, and that requests the customer 204A to review and confirm that the customer mobile device 212A should be used. In the illustrated example, the confirmation section 308 includes a device description 314 (e.g., "AMY'S TABLET") and an image 316 depicting the customer mobile device 212A. In response to being presented the confirmation section 308, the customer 204A may confirm that the customer mobile device 212A should be used by selecting the confirm button 318, or may determine that the customer mobile device identified in the confirmation section 308 is not the customer mobile device that should be used and select the show more devices button 320 to request that merchant device 202 display more customer mobile devices (e.g., by requesting new customer mobile device identification information and determining a different customer mobile device that should be used in the payment transaction, by using previously received customer mobile device identification information to display other customer mobile devices as discussed below, etc.).

Referring now to FIG. 3B, in some embodiments, the merchant device 202 may display customer mobile device identification information associated with a plurality of detected customer mobile devices that are located within a first range 330 of the merchant device 202. For example, the customer mobile device identification information associated with the plurality of detected customer mobile devices located within the first range 330 of the merchant device 202 may be displayed after the customer 204A selects the show more devices button 320 in the confirmation section 308 discussed above. FIG. 3B illustrates an embodiment of the merchant device 202 including the display subsystem 206 displaying a customer mobile device identification screen 304 that identifies customer mobile devices 212A, 212B, and 212C that are located within the first range 330 of the merchant device 202. In the illustrated example, some of the customer mobile devices identified on the customer mobile device identification screen 304 (e.g., customer mobile devices 212A and 212B) may be associated with the same customer (e.g., "AMY"), and some of the customer mobile devices identified on the customer mobile device identification screen 304 (e.g., mobile customer devices 212A and 212C) may be associated with different customers (e.g., "AMY" and "JOHN").

In response to the customer mobile device identification screen 304 being displayed, the customer 204A may select any of the identified customer mobile devices, and that selection may be based on customer mobile device identification information for the customer mobile device that includes a device description 314, a device image 316, a device location 332 (e.g., relative to the merchant device 202), and/or other information that may have been received from the customer mobile devices. In the illustrated example, the customer 204A has chosen the customer mobile device 212B (e.g., "AMY'S PHONE"), and may select the confirm button 334 to confirm the selection of the customer mobile device 212B (e.g., "AMY'S PHONE"). Alternatively, the customer 204A may determine that none of the identified customer mobile devices 212A, 212B, and 212C should be used and may, for example, expand the first range 330 (e.g., by performing a hand gesture at the border of the first range 330 on the customer mobile device identification screen 304 when the display subsystem 206 is a touch input display, by selecting the show more device button 336, etc.) to request the merchant device 202 to display customer mobile devices located within that expanded range.

As such, at block 104, a customer mobile device of a customer is identified, which may assist the payment transaction of the customer at the POS device as described in detail below. However, in some embodiments, the customer 204A may perform the payment transaction without any assistance of a customer mobile device. For example, the customer 204A may use the merchant device 202 (e.g., the display subsystem 206 on the merchant device 202) to provide payment account information (e.g., authentication credentials) for a payment account provided by the payment service provider. The merchant device 202 may then process a payment request for the payment transaction using that payment account. In another example, the customer 204A may present a physical card (e.g., by "swiping" a credit card, debit card, or store card (e.g., a loyalty card) issued by the merchant) in the card reader that is included in the merchant device 202 in order to have the payment request for the payment transaction processed using information stored on that card. In some examples, the merchant device 202 may determine that it is the first time that the physical card has been used at the merchant physical location. In response to such a determination, the merchant device 202 may request an operator of the merchant device 202 (e.g., by displaying a message to the operator) to check the physical card. The operator may be requested to confirm that the back of the physical card is properly signed, confirm that the signature on the back of the physical card is consistent with a signature on a photo identification card (e.g., a driver's license), and/or confirm that the name on the physical card is the same as the name on a photo identification card. In some examples, the merchant device 202 may determine that the physical card had previously been used at the merchant physical location. In response to such a determination, the operator of the merchant device 202 may not be required to check that physical card.

After identifying customer mobile device, the method 100 may then proceed to block 106 where the system provider device may generate an authentication request and provide the authentication request for display on the merchant device 202. In an embodiment, the authentication request may be based on a merchant trust level configuration that is associated with the merchant physical location, discussed in further detail below. In response to the authentication request being displayed on the merchant device 202, the customer may provide authentication information through the merchant device 202, and that authentication information may be used by the customer mobile device 212A that was selected to authenticate a payment account that is provided to the customer by a payment service provider.

In some embodiments, the system provider device may retrieve the merchant trust level configuration that is associated with the merchant physical location from a merchant trust level configuration database that is accessible to the system provider device. The merchant trust level configurations of the present disclosure may be provided by a system provider device to allow a customer to manage authentication requirements that will be implemented when their customer device is detected at different merchant physical locations. For example, using the merchant trust level configurations, a customer may configure trust levels associated with particular merchant physical locations based on, for example, past experiences at those merchant physical locations, based on a general reputation of the merchants of those merchant physical locations, and/or based on any other characteristics of a merchant or merchant physical location that would be apparent to one of skill in the art in possession of the present disclosure. In another example, using the merchant trust level configurations, the customer may configure an authentication requirement for a particular merchant physical location based on their transaction history at that particular merchant physical location (e.g., whether it is the customer's first visit to the merchant physical location), and/or the trust level associated with that particular merchant physical location.

In various embodiments, the authentication information required to perform a transaction may include an authentication passcode, an answer to a shared secret question, biometric characteristic(s) (e.g., a fingerprint, a voice, a face image, walking posture, standing posture, etc.), location data from a vehicle of the customer indicating that the customer's vehicle is within a predetermined range from the merchant physical location, location data from a wearable device of the customer indicating that that wearable device is at the merchant physical location, and/or other type of authentication information. In some embodiments, the merchant device may include various devices configured to capture biometric characteristics for generating the authentication information. In an example, the merchant device includes a fingerprint scanner configured to capture a fingerprint of the customer. In another example, the merchant device includes a microphone configured to capture a voice of the customer. In yet another example, the merchant device includes a camera configured to capture a face of the customer, walking posture of the customer, and/or standing posture of the customer. In yet another example, the merchant device includes sensors (e.g., pressure sensors) embedded in the floor, and those sensors are configured to capture walking posture and/or standing posture of the customer.

Figure 4:
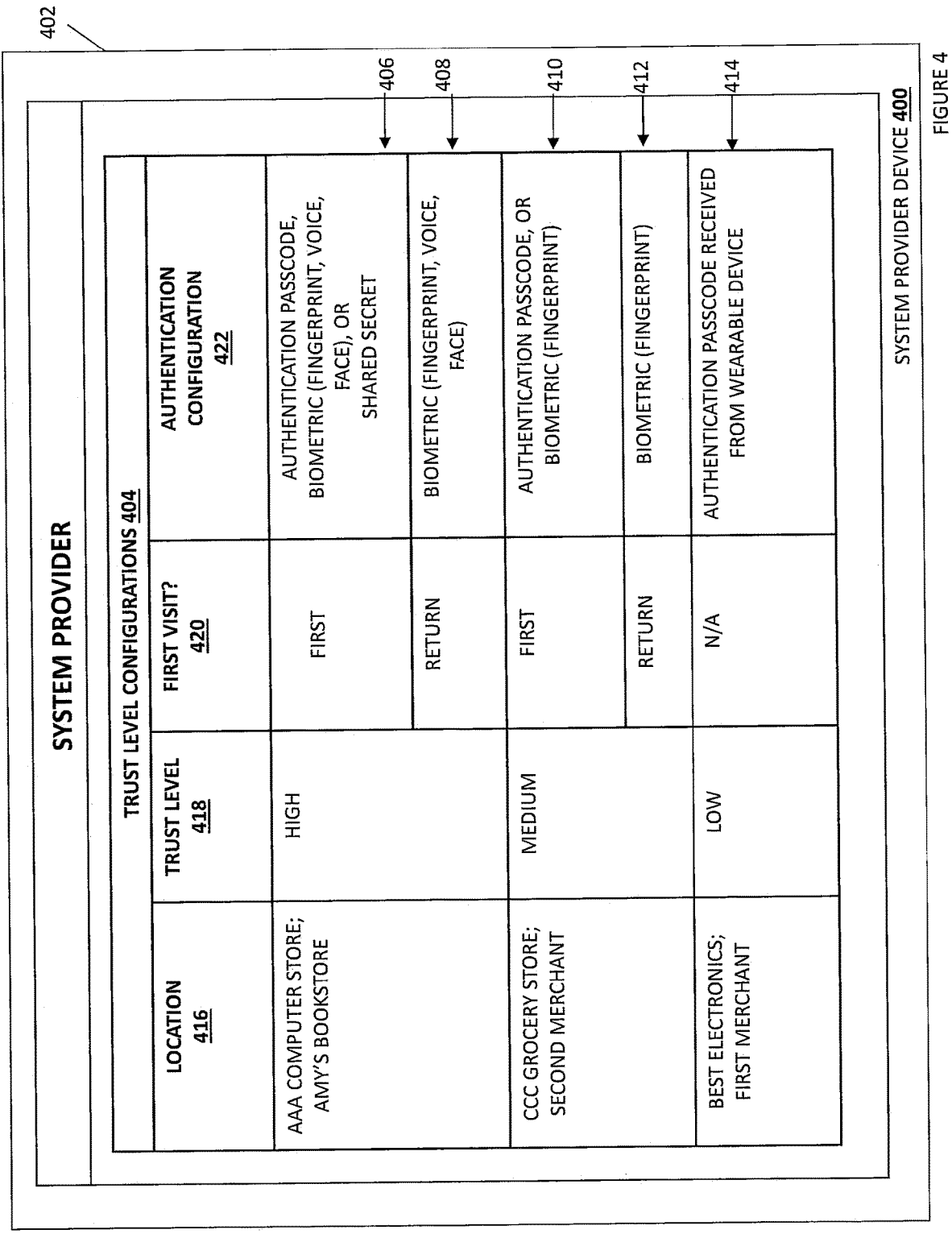
FIG. 4 illustrates an embodiment of a system provider device displaying a merchant trust level configuration screen.

Referring now to FIG. 4, an embodiment of a system provider device 400 is illustrated that includes a display subsystem 402 displaying a merchant trust level configuration screen 404 that includes merchant trust level configurations 406, 408, 410, 412, and 414 that may have been previously received by the system provider device 400 from a customer (e.g., via their customer mobile device or other devices). For example, each of the merchant trust level configurations 406-414 may include merchant physical location information 416 that identifies the merchant physical location, trust level information 418 that indicates the customer's trust level associated with a merchant and/or a merchant physical location (e.g., "HIGH", "MEDIUM," "LOW"), first visit information 420 that indicates whether an authentication configuration is associated with the first time that the customer has visited that merchant physical location or a return visit to the merchant physical location, and an authentication configuration 422 that provides authentication requirements for authenticating a payment account of the customer for performing a payment transaction at the particular merchant physical location. In different embodiments, the customer may add, remove, and/or edit the merchant trust level configurations and/or any information associated with merchant trust level configurations. For example, any or all of the merchant physical location information 416, trust level information 418, first visit information 420, and authentication configuration 422 associated with the merchant trust level configurations may be created, edited, and/or deleted by the customer.

In the illustrated example, the merchant trust level configuration 406 provides that certain merchant physical locations (e.g., "AAA COMPUTER STORE," "AMY'S BOOKSTORE") have been designated with a "HIGH" trust level, and for a first visit by the customer to those merchant physical locations, the authentication information required to perform a payment transaction includes an authentication passcode, a biometric characteristic (e.g., "FINGERPRINT," "VOICE," "FACE"), or an answer to a shared secret question. The merchant trust level configuration 408 provides that, for a return visit by the customer to those same merchant physical locations, the authentication information required to perform a payment transaction includes a biometric characteristic ("FINGERPRINT," "VOICE," "FACE").

As shown in the illustrated embodiment, authentication requirements may be different for merchant physical locations having different trust levels. For example, the merchant trust level configuration 410 provides that for merchant physical locations with a "MEDIUM" trust level, the authentication information required to perform a payment transaction may not include the use of an answer to a shared secret question on either the first or subsequent visits by the customer to those merchant physical locations. The merchant trust level configuration 410 also provides that for merchant physical locations with a "MEDIUM" trust level, the only biometric characteristic that may be used as authentication information to perform a payment transaction is a fingerprint. In another example, the merchant trust level configuration 414 provides that for merchant physical locations with a "LOW" trust level, the authentication information required to perform a payment transaction may include a dynamically created authentication passcode that the customer receives through a wearable device, regardless of whether it is the first or a subsequent time that the customer has visited those merchant physical locations.

At block 106, the system provider device 400 may determine a merchant physical location based on location data provided the merchant device 202 (e.g., via a GPS device in the merchant device 202) and/or provided by the customer mobile device 212A (e.g., via a GPS device in the customer mobile device 212A), and retrieve a merchant trust level configuration associated with that merchant physical location. At block 106, the system provider device 400 may also determine whether this is the first time that the customer has visited that merchant physical location and/or performed a payment transaction at that merchant physical location (e.g., based on the customer's past transaction history), retrieve a merchant trust level configuration corresponding to the merchant physical location and the number of times the customer has visited that merchant physical location, and generate an authentication request based on the retrieved merchant trust level configuration.

Figure 5A:
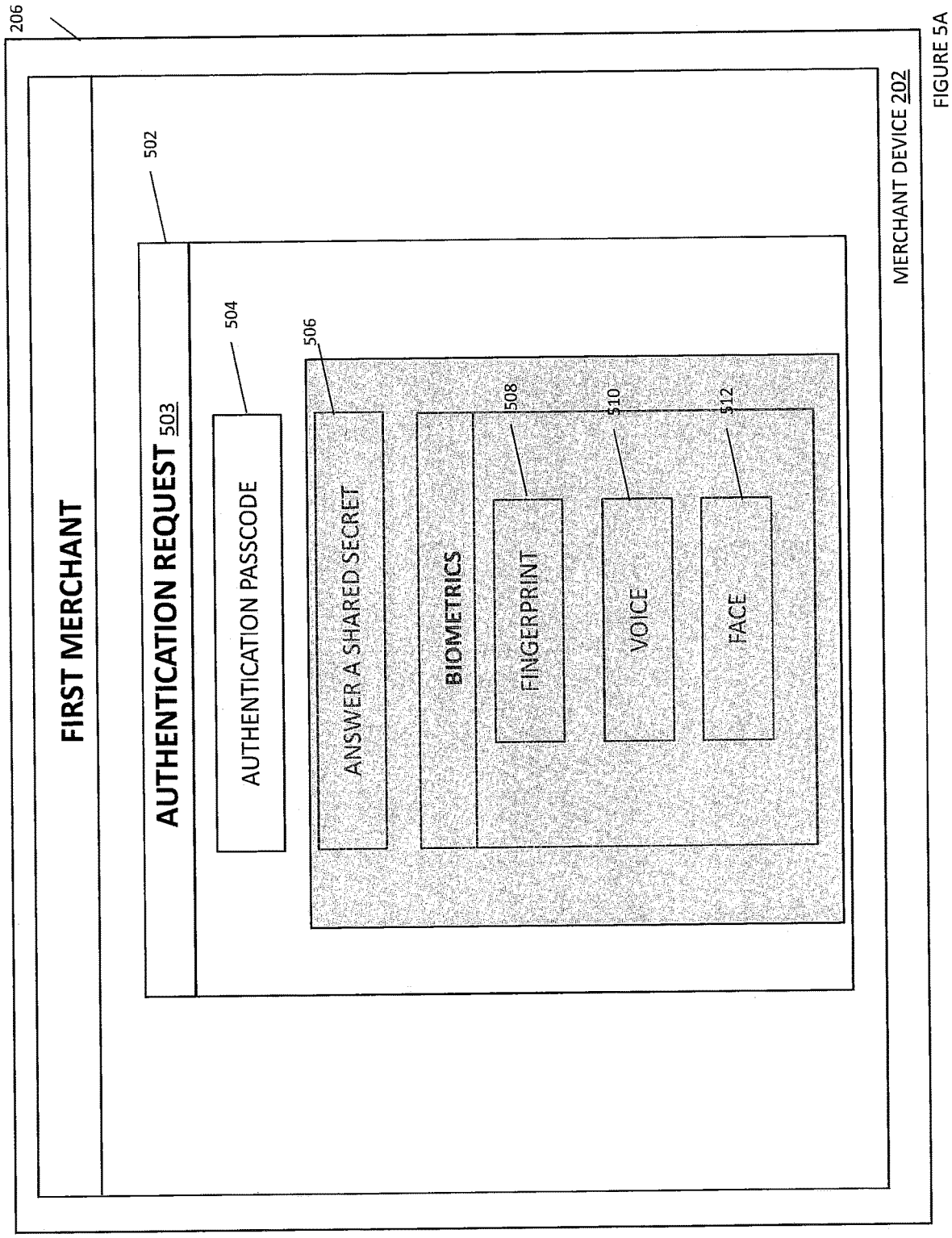
FIG. 5A illustrates an embodiment of a merchant device displaying an authentication request screen.
Figure 5B:
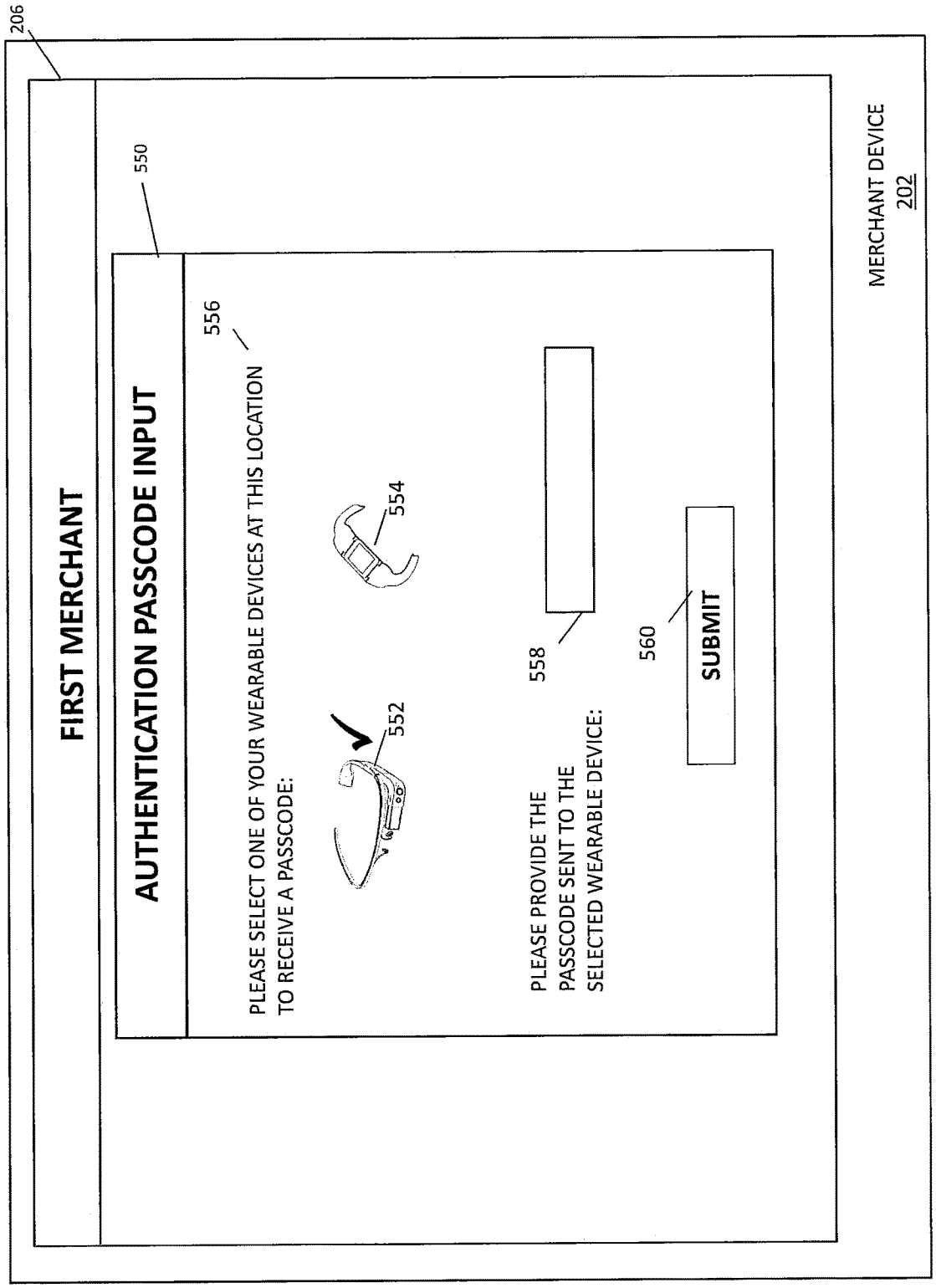
FIG. 5B illustrates an embodiment of a merchant device displaying an authentication request screen.

With reference to FIGS. 5A and 5B, at block 106 authentication requests generated based on merchant trust level configurations may be sent to the merchant device 202 for display on its display subsystem. Referring first to FIG. 5A, after determining a merchant physical location (e.g., "FIRST MERCHANT") based on the location provided by the merchant device 202 and/or the location provided by the customer mobile device 212A, the system provider device 400 may determine that the merchant trust level configuration 414 is associated with the merchant physical location, generate an authentication request 503 that is based on the merchant trust level configuration 414, and send the authentication request 503 to the merchant device 202 for display on its display subsystem.

FIG. 5A illustrates an embodiment of the merchant device 202 including the display subsystem 206 displaying an authentication screen 502 including the generated authentication request 503 having authentication options 504, 506, 508, 510, and 512. The authentication option 504 ("AUTHENTICATION PASSCODE") is configured to allow the customer 204A to provide a passcode for authentication, the authentication option 506 ("ANSWER A SHARED SECRET") is configured to allow the merchant device 202 to display a shared secret question so that the customer 204A may provide an answer to that shared secret question through the merchant device 202, and the biometric authentication options 508, 510, and 512 are configured to allow the customer 204A to be authenticated based on various biometric characteristics (e.g., "FINGERPRINT," "VOICE," "FACE") of the customer 204A. In the illustrated example, the authentication option 504 has been enabled while the authentication options 506, 508, 510, and 512 have been disabled based on the merchant trust level configuration 414 associated with the merchant physical location requiring an authentication passcode received from a wearable device of the customer 204A, discussed above with reference to FIG. 4.

Referring now to FIG. 5B, if the customer 204A selects the authentication option 504 ("AUTHENTICATION PASSCODE") on the authentication screen 502 discussed above with reference to FIG. 5A, the merchant device 202 may display an authentication passcode input screen 550 on the display subsystem 206 that was provided by the system provider device. The display subsystem 206 includes a wearable device selection section 556 that has a request to the customer 204A to select a wearable device for receiving a dynamically generated authentication passcode from the system provider device. Such a wearable device may be selected from wearable devices 552 and 554 that have been detected located at the merchant physical location or that may be associated with the customer 204A in a database that is accessible by the system provider device. In the illustrated example, the customer has selected the wearable device 552 to receive the dynamically generated authentication passcode. In response, the system provider device dynamically generates an authentication passcode and sends that authentication passcode to the wearable device 552 using, for example, a wearable device identifier associated with that wearable device and/or the customer 204A in a database that is accessible to the system provider device. The customer 204A may then receive the authentication passcode through the selected wearable device (e.g., through an audible message provided via a headphones attached to the wearable device 552, through a display provided on the wearable device 552, etc.), and provide the received authentication passcode in an authentication passcode field 558 provided on the authentication passcode input screen 550. The customer 204A may then select a submit button 560 to cause the authentication information including the authentication passcode to be sent by the merchant device 202 to the system provider device.

In various embodiments, the authentication passcode provided to the merchant device 202 may be different from a regular account password that may be used to access the customer's payment account provided by the system provider device. In an example, the authentication passcode is a one-time passcode that is valid for only one session established between the identified customer mobile device 212A and the merchant device 202. In another example, the authentication passcode may be used for multiple sessions established between the identified customer mobile device 212A and one or more merchant devices. However, in that example, that authentication passcode alone is not usable by the merchant to access the customer's payment account without the presence of the customer and/or the customer's mobile device at the merchant physical location. In some examples, the authentication passcode is the same as the identification passcode. In other examples, the authentication passcode is different from the identification passcode. By providing to the merchant device an authentication passcode that is different from a regular account password and that is unusable by the merchant device to access the customer's payment account without the assistance of the customer mobile device, improved security and privacy is achieved.

Following receiving the authentication information from the customer 204A through the merchant device 202, the method 100 may then proceed to block 108 where the system provider device uses the authentication information to authenticate the customer to use a payment account provided to the customer by the payment service provider. In an example, the merchant device 202 may send the authentication information to the system provider device through a network (e.g., such as wireless networks including telecommunications, mobile, and cellular phone networks) without using the identified customer mobile device 212A. In that example, the system provider device may perform the authentication of the payment account and/or the payment transaction without using the identified customer mobile device 212A.

Alternatively, in another example, at block 108, the authentication information is sent to the system provider device using the identified customer mobile device 212A. For example, the merchant device 202 may send the authentication information to the identified customer mobile device 212A using a short-range wireless communication protocol. The identified customer mobile device 212A may then send the authentication information through a network (e.g., such as wireless networks including telecommunications, mobile, and cellular phone networks) to the system provider device. In some embodiments, the payment application provided by the payment service provider on the customer mobile device 212A may be used to provide the account identifier of the payment account and send the authentication information to the system provider device. In one example, at block 108 the customer 204A may be logged into their payment account via the payment application on their customer mobile device 212A before the customer 204A is located near the POS device included in the merchant device 202 (e.g., the customer mobile device 212A may detect the customer's arrival at the merchant physical location and, in response, may log the customer 204A into their payment account). In another example, the system provider device may send a notification to the customer mobile device 212 upon determining (e.g., via location data sent by the customer mobile device 212) that the customer mobile device 212 has entered a range of the merchant device 202, and that notification may cause the customer mobile device 212A to automatically log the customer into the payment account (e.g., using login credentials stored in the customer mobile device 212A and/or accessible to the system provider device). Thus, at block 108, the customer mobile device 212 may use the payment application to send the authentication information received at block 106 to the system provider device. The system provider device may receive the account identifier of the payment account of the customer and the authentication information from the customer mobile device 212, and perform an authentication process to authenticate the customer with the payment account provided by the payment service provider based on the account identifier and the authentication information.

In some embodiments, at block 108, the authentication process performed by the system provider device includes confirming that the customer mobile device 212 is located at the merchant physical location (e.g., based on location data provided by the merchant device 202 and the location data provided by the customer mobile device 212A).

It is noted that while the authentication activities performed by the system provider device are used in the examples above to describe the authentication process, those examples are not meant to be limiting. For example, the system provider device may include the customer mobile device 212A executing a payment application provided by the payment service provider, and the customer mobile device 212A may perform the authentication activities using the authentication information received via a user interface of the merchant device 202 responsive to the authentication request 503. In another example, the system provider device may include a server that is remote to the customer mobile device 212A and the merchant device 202, where the server communicates with the customer mobile device 212A and the merchant device 202 through one or more networks (e.g., such as wireless networks including telecommunications, mobile, and cellular phone networks). In that example, the server may perform the authentication activities using the authentication information received via a user interface of the merchant device 202 responsive to the authentication request 503.

In some embodiments, following the authentication of the customer with their payment account, the method 100 may then proceed to block 110 where the system provider device generates funding instrument presentation information based on a funding instrument presentation configuration for funding instruments that are included in the payment account of the customer. The system provider then provides the funding instrument presentation information to the merchant device 202, and the merchant device 202 provides that funding instrument presentation information for display. The customer 204A may then select a payment funding instrument for making a payment for the payment transaction by selecting that payment funding instrument from the payment funding instruments displayed on the merchant device 202 as part of the funding instrument presentation information.

As discussed above, customers may be reluctant to send sensitive information (e.g., credit card numbers, credit card expiration dates, billing phone numbers, etc.) to merchant devices due to security and fraud concerns. To address such concerns, the funding instrument presentation information sent by the system provider device to the merchant device 202 may provide funding instrument references to sensitive information about the funding instruments of the customer 204A. As such, the system provider device allows the customer to select a particular funding instrument for use in performing a transaction at the POS device based on the funding instrument presentation information without sending any sensitive information about the customer and/or about the funding instruments to the merchant devices. Such sensitive information about a particular funding instrument may include actual financial information of that particular funding instrument, including for example, a credit card number, a credit card expiration date, a billing phone number, a billing address, etc. Those funding instrument presentation references provide a marker or a proxy for a funding instrument without including any sensitive information. As such, the funding instrument presentation information may also be referred to as funding instrument maker information or funding instrument proxy information. The references may be based on a funding instrument presentation configuration, with those funding instrument references enabling the customer to identify the associated funding instruments without exposing any of the sensitive information associated with those funding instruments. In an embodiment, the funding instrument presentation information may be generated based on a funding instrument presentation configuration that may be determined based on a merchant trust level associated with the merchant physical location, a funding instrument type (e.g., a bank card, a credit card, a store card, a coupon, and/or other funding instrument type) of a particular funding instrument, and/or other information associated with the merchant physical location and/or the funding instruments that would enable the functionality discussed below.

Referring to FIG. 6, an embodiment of the system provider device 400 including the display subsystem 402 displaying a funding instrument presentation configuration screen 602 is illustrated that includes funding instrument presentation configurations 604, 606, and 608 that may have been previously determined by the system provider and/or received by the system provider device 400 from the customer 204A. In the illustrated embodiment, each funding instrument presentation configuration includes merchant trust level information 612 that indicates a trust level (e.g., "HIGH," "MEDIUM," "LOW") associated with a merchant physical location, and types of funding instrument information that may be included in funding instrument presentation information that may be provided for display on the merchant device 202. The types of funding instrument information may include an image associated with the funding instrument (e.g., an image of a credit card, an image previously provided by the customer to represent the credit card), a proxy name (nickname) that the customer previously provided to represent the funding instrument (e.g., "PROXY NAME ONE" for a bank card), the last four digits of a credit card number of a credit card, an assigned purchase category to a credit card, an image indicating that assigned purchase category, and/or other types of funding instrument information that may help the customer to identify the funding instrument.

In the illustrated example, the funding instrument presentation configuration 604 provides that, for a merchant physical location with a high trust level, funding instrument presentation information provided for display on a merchant device may include various types of funding instrument information that are based on the type of a particular funding instrument. For example, for a funding instrument that is a bank card, the funding instrument presentation information according to the funding instrument presentation configuration 604 may include both the bank name and the last four digits of the bank card number. In another example, for a funding instrument that is a credit card or a store card, the funding instrument presentation information according to the funding instrument presentation configuration 604 may include the last four digits of the card number and the expiration date of the card. In yet another example, for a funding instrument that is a coupon, the funding instrument presentation information according to the funding instrument presentation configuration 604 may include an image of the coupon.

In the illustrated example, the funding instrument presentation configuration 606 provides that, at a merchant physical location with a medium trust level, the funding instrument presentation information provided for display on a merchant device may include more general information about the funding instruments compared to the funding instrument information types provided in the funding instrument presentation configuration 604. For example, for a funding instrument that is a bank card, the funding instrument presentation information according to the funding instrument presentation configuration 606 may include a bank name and a bank logo. In another example, for a funding instrument that is a credit card, the funding instrument presentation information according to the funding instrument presentation configuration 606 may include an assigned purchase category to that credit card and an image indicating that purchase category. In a further example, for a funding instrument that is a store card, the funding instrument presentation information according to the funding instrument presentation configuration 606 may include an image of the store card.

In the illustrated example, the funding instrument presentation configuration 608 provides that, at a merchant physical location with a low trust level, a wearable device associated with the customer may be required in addition to the merchant device 202 to enable the customer to select a payment funding instrument. The funding instrument presentation configuration 608 includes a funding instrument presentation configuration 610A that identifies funding instrument information types that may be provided as funding instrument presentation information for display on a merchant device when at a merchant physical location associated with a low trust level. Further, a funding instrument presentation configuration 610B that identifies funding instrument information types that may be provided as funding instrument presentation information for display on a wearable device when at a merchant physical location associated with a low trust level.

In the illustrated example, the funding instrument presentation configuration 610A provides that for funding instruments of various types (e.g., "BANK CARD," "CREDIT CARD," "STORE CARD," "COUPON"), only an index identifier for the funding instrument presentation information may be provided for display on a merchant device at a merchant physical location associated with a low trust level. The funding instrument presentation configuration 610B provides that for a bank card, the funding instrument presentation information may include the bank name when sent to the wearable device of the customer for display, and for a credit card, a store card, or a coupon, the funding instrument presentation information may include an image of that funding instrument when sent to the wearable device of the customer for display.

Figures 7A, 7B:
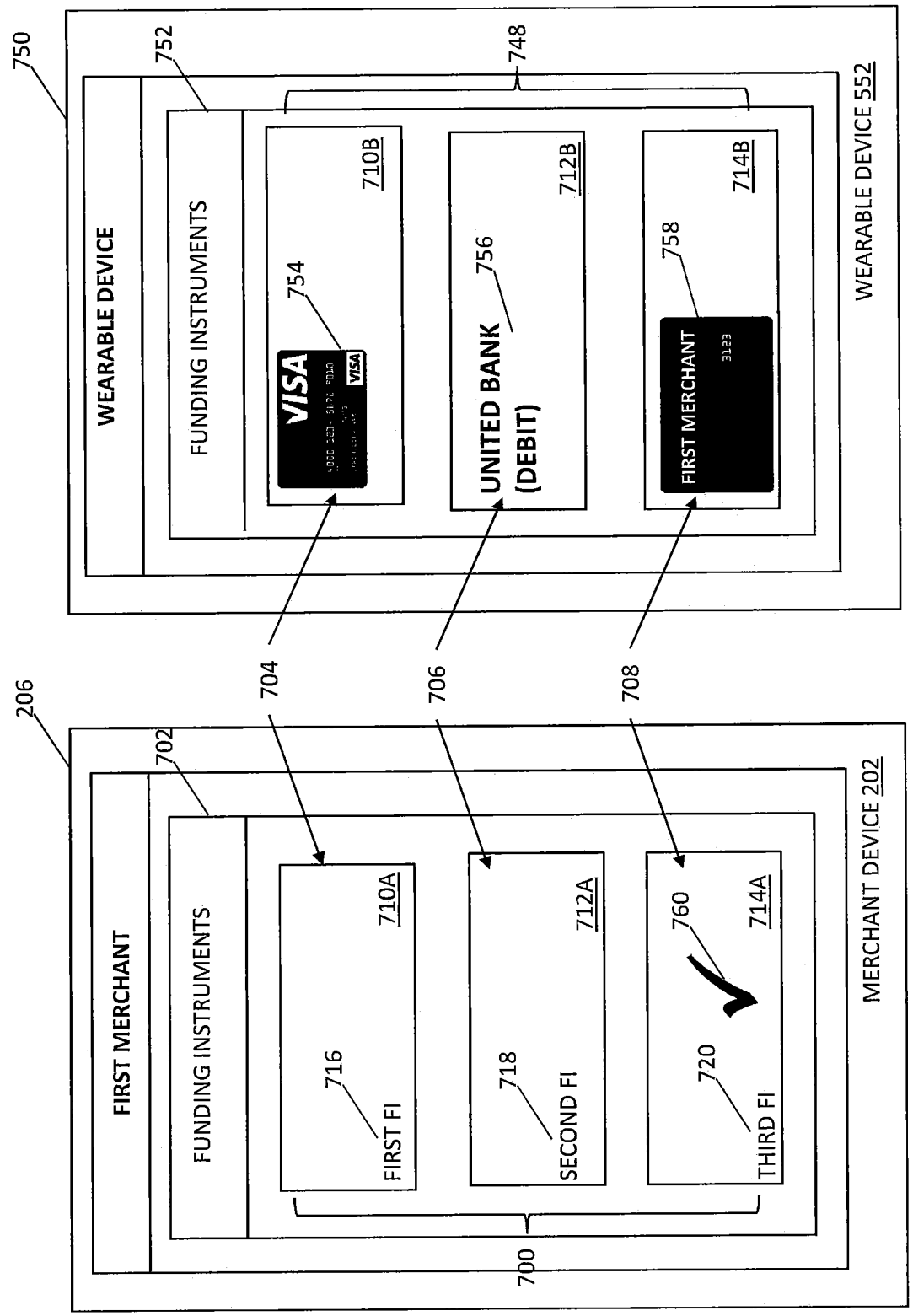
FIG. 7A illustrates an embodiment of a merchant device displaying a funding instruments screen.
FIG. 7B illustrates an embodiment of a wearable device displaying a funding instruments screen.

In an embodiment, after generating the funding instrument presentation information based on the funding instrument presentation configuration at block 110, the system provider device may send the funding instrument presentation information to the merchant device 202 for display on its display subsystem. With reference to FIGS. 7A and 7B, at block 110 the system provider device may detect that the customer is located at a merchant physical location associated with a first merchant, and determine that a low trust level is associated with the first merchant and/or the merchant physical location of the first merchant (e.g., based on a merchant trust level configuration 414). The system provider device 400 may then retrieve the funding instrument presentation configuration 608 from a database (e.g., a funding instrument presentation configuration database that is accessible to the system provider device), and generate funding instrument presentation information associated with the funding instruments 704, 706, and 708 that are included in a payment account of the customer that is provided by the payment service provider. Based on the funding instrument presentation configuration 610A, funding instrument presentation information 700 may be generated and sent to the merchant device 202 for display on its display subsystem. In addition or in the alternative, funding instrument presentation information 748 may be generated based on the funding instrument presentation configuration 610A and sent to the wearable device 552 for display on its display subsystem.

Referring first to FIG. 7A, an embodiment of the merchant device 202 is illustrated including the display subsystem 206 displaying a funding instruments screen 702 that includes funding instrument presentation sections 710A, 712A, and 714A having the funding instrument presentation information for funding instruments 704, 706, and 708, respectively, of the customer 204A. As defined by the funding instrument presentation configuration 610A, the funding instrument presentation information 700 provided to the merchant device 202 for display on the display subsystem 206 includes an index identifier for each funding instrument. Specifically, the funding instrument presentation section 710A displays an index identifier 716 (e.g., "FIRST FI") for the funding instrument 704, the funding instrument presentation section 712A displays an index identifier 718 (e.g., "SECOND FI") for the funding instrument 706, and the funding instrument presentation section 714A displays an index identifier 720 (e.g., "THIRD FI") for the funding instrument 708.

Referring next to FIG. 7B, an embodiment of a wearable device 552 associated with the customer is illustrated including a display subsystem 750 displaying a funding instrument screen 752 that includes funding instrument presentation sections 710B, 712B, and 714B having the funding instrument presentation information for funding instruments 704, 706, and 708, respectively, of the customer 204A. As defined by the funding instrument presentation configuration 610B, the funding instrument presentation information 748 provided to the wearable device 552 for display on the display subsystem 750 may include more detailed information than is provided on the merchant device 202 of FIG. 7A (e.g., the bank name for a bank card, and images of the funding instrument where the funding instrument is a credit card, a store card, or a coupon) to help the customer to identify and select a funding instrument for use in making a payment for the payment transaction. Specifically, the funding instrument presentation section 710B displays an image 754 of the funding instrument 704 (e.g., a credit card), the funding instrument presentation section 712B displays a bank name 756 (e.g., "UNITED BANK") associated with the funding instrument 706 (e.g., a bank card), mid the funding instrument presentation section 714B displays an image 758 of the funding instrument 708 (e.g., a store card issued by the merchant).

In some embodiments, the wearable device 552 may be provided by smart glasses, and/or other wearable devices known in the art. In those embodiments, the customer may use the funding instrument presentation information 748 that is displayed in a more detailed manner on the wearable device 552 to help identify and select the funding instruments that are displayed on the merchant device 202. For example, the customer 204A may use the image displayed on the wearable device 552 for the funding instrument 710B to identify that the index identifier "FIRST FI" displayed on the merchant device 202 for the funding instrument 710A may be selected to designate that credit card for use in performing the payment transaction.

In some embodiments, the wearable device 552 may be a head mounted device implementing augmented reality technology. In such embodiments, the funding instrument presentation information 748 received and displayed by the wearable device 552 may be overlaid on the display subsystem 206 of the merchant device 202. For example, using such an augmented reality device, the image 754 of the funding instrument 704 may be displayed on the display subsystem 750 of the wearable device 552 such that it overlaps the view by the customer 204A of the funding instrument presentation section 710A displayed on the display subsystem 206 of the merchant device 202. The bank name 756 of the funding instrument 706 may be displayed on the display subsystem 750 of the wearable device 552 such that it overlaps the view by the customer 204A of the funding instrument presentation section 712A displayed on the display subsystem 206 of the merchant device 202. Further, the image 758 of the funding instrument 706 may be displayed on the display subsystem 750 of the wearable device 552 such that it overlaps the view by the customer 204A of the funding instrument presentation section 714A displayed on the display subsystem 206 of the merchant device 202. As such, the customer 204A may identify and select funding instruments using the merchant device 202 and based on the augmented reality content that is provided by the wearable device 552.

In an embodiment, after identifying the funding instruments 704, 706, and 708 associated with the funding instrument presentation sections 710A, 712A, and 714A, the customer may select the store card 708 displayed on the merchant device 202 (e.g., by selecting the funding instrument presentation section 714A) for use in performing the payment transaction. A selection indicator 760 may then be displayed by the merchant device 202 on the funding instrument presentation section 714A to indicate to the customer that the funding instrument associated with the funding instrument presentation section 714A has been selected.

Figure 8:
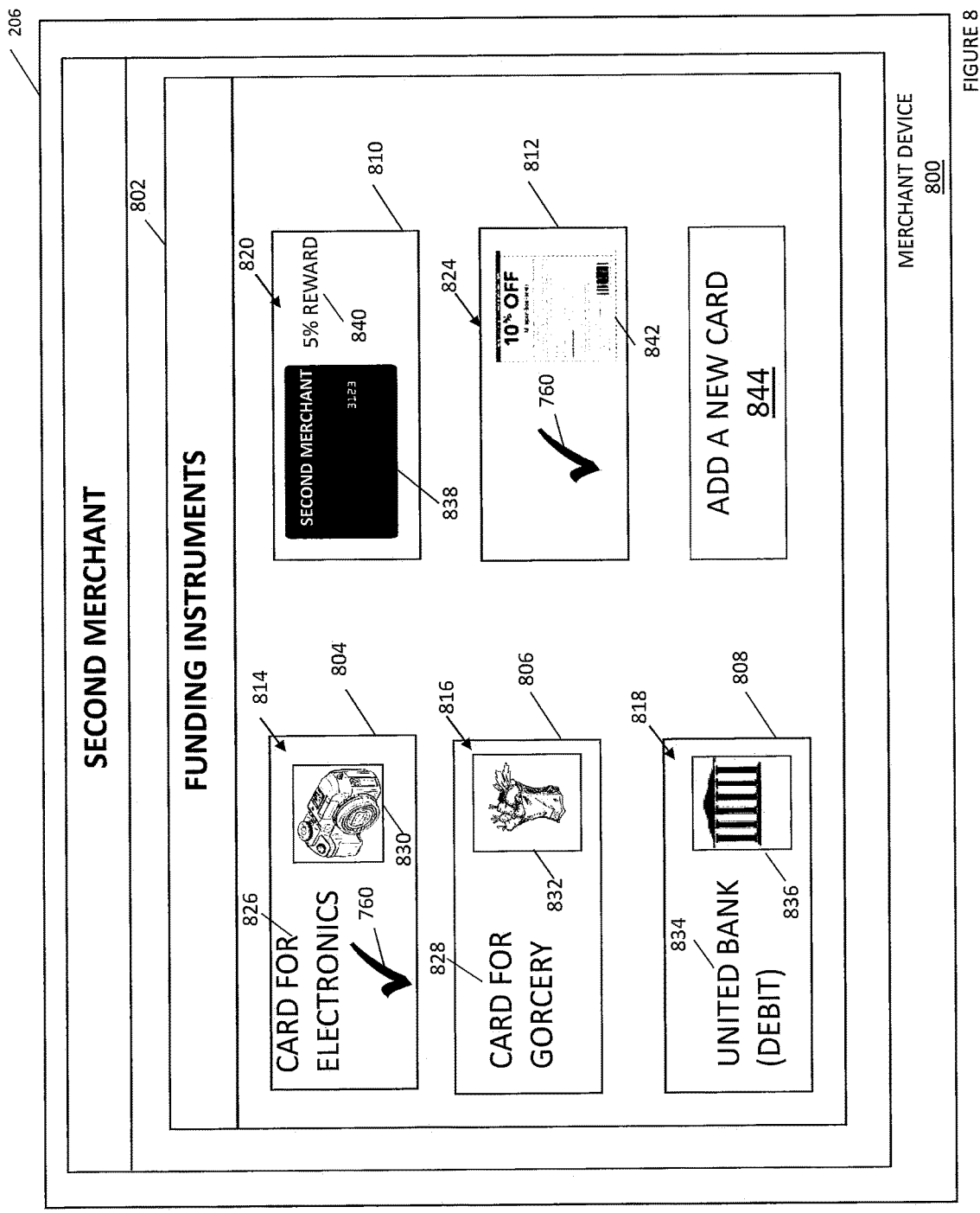
FIG. 8 illustrates an embodiment of a merchant device displaying a funding instruments screen.

Referring now to FIG. 8, in some embodiments the customer may identify and select a payment funding instrument based on the funding instrument presentation information displayed on the merchant device 202 without the assistance of a wearable device. For example, FIG. 8 illustrates an embodiment of a merchant device 800 including a display subsystem 206 displaying a funding instruments screen 802 having funding instrument presentation sections 804, 806, 808, 810, and 812, which display the funding instrument presentation information for funding instruments 814, 816, 818, 820, and 824, respectively, of the customer 204A.

In an embodiment, the system provider device may detect that the customer is located at a merchant physical location that is associated with a second merchant, and determine that a medium trust level is associated with that second merchant (e.g., based on a merchant trust level configuration 410). The system provider device 400 may then retrieve a funding instrument presentation configuration 606 based on that merchant trust level configuration, generate funding instrument presentation information based on the funding instrument presentation configuration 606 for funding instruments 814, 816, 818, 820, and 824 that are included in a payment account of the customer that is provided by the payment service provider, and send the funding instrument presentation information to the merchant device 800 for display on its display subsystem 206.

In the illustrated example, the funding instrument presentation sections 804 and 806 include funding instrument presentation information for funding instruments 814 and 816 that are credit cards, and that have been assigned purchase categories 826 and 828 (e.g., "CARD FOR ELECTRONICS," "CARD FOR GROCERY") that are associated with purchase category images 830 and 832 (e.g., images previously provided by the customer). The funding instrument presentation section 808 includes funding instrument presentation information for the funding instrument 818 that is a bank card, and that includes a bank name 834 (e.g., "UNITED BANK") and a bank logo image 836 (e.g., automatically retrieved by the system provider device based on the bank name, or previously provided by the customer).

The funding instrument presentation section 810 includes funding instrument presentation information for the funding instrument 820 that is a store card issued by the second merchant, which includes a card image 838, and which includes reward information 840 (e.g., "5% REWARD") indicating a reward for making a purchase at the second merchant using the store card 820. The funding instrument presentation section 812 includes funding instrument presentation information for the funding instrument 824 that is a coupon (e.g., "10% OFF") that may be used for a purchase at the second merchant, and includes an image 842 of the coupon.

In some embodiments, the customer may add a new funding instrument to the payment account provided by the payment service provider by selecting add a new card button 844. For example, the customer may provide a new card, which is not listed in the funding instruments screen 802, to a card reader of the merchant device 800 in order to provide the merchant device 800 funding instrument information associated with that new card, and that funding instrument information may then be sent from the merchant device 800 to the mobile customer mobile device 212 or system provider device. That funding instrument information may then be added to available funding instruments associated with the payment account of the customer that is provided by the payment service provider and, in some embodiments, the customer may select the newly added card to designate that card for performing the payment transaction.

In the illustrated example, the customer has selected the funding instruments 814 and 824 for performing the payment transaction, and the merchant device 800 has provided selection indicators 760 for display in the funding instrument presentation sections 804 and 812 to indicate that funding instruments 814 and 824 have been selected for performing the payment transaction. The merchant device 800 may then send the system provider device funding instrument selection information that indicates that the funding instruments 814 and 824 have been selected by the customer for use in performing the payment transaction. The system provider device may then use funding instrument identifiers that are included in the funding instrument selection information to identify the payment funding instruments that were selected by the customer to perform the payment transaction.

At block 112, in an example, the merchant device 800 may send the funding instrument selection information to the system provider device through a network (e.g., such as wireless networks including telecommunications, mobile, and cellular phone networks) without using the identified customer mobile device 212A. Alternatively, in another example, the funding instrument selection information is sent to the system provider device using the identified customer mobile device 212A. For example, the merchant device 800 may send the funding instrument selection information to the identified customer mobile device 212A using a short-range wireless communication protocol. The identified customer mobile device 212A may then send the funding instrument selection information through a network (e.g., such as wireless networks including telecommunications, mobile, and cellular phone networks) to the system provider device.

In some embodiments, the system provider device 400 may determine a favorite or default funding instrument for use in performing payment transactions for the customer at merchant physical locations based on past transaction information including, for example, the customer's past transactions at the merchant physical location or other merchant physical locations, past transactions of other customers at the merchant physical location, the customer's past transaction for online transactions, etc. In an example, a favorite or default funding instrument may be a funding instrument that the customer used in a most recent transaction at the merchant physical location. In another example, a favorite or default funding instrument may be the funding instrument that may earn most points or rewards when used to perform the payment transaction. In another example, the favorite or default funding instrument may be selected based on personal financial information associated with the funding instrument including, for example, impending payments, available credit, fees, etc. The funding instrument presentation information may indicate a favorite or default funding instrument for the customer by providing for the display of an indicator on the merchant device (e.g., by adding a favorite sign in the corresponding funding instrument section) to help the customer identify and select that favorite or default funding instrument for use in performing the payment transaction. In some embodiments, the system provider device 400 may determine a default bundle of funding instruments that includes multiple funding instruments (e.g., credit cards, coupons, reward cards, discounts on associated products/services, and other offers) based on purchase patterns extracted from past transactions of the customer (e.g., based on various transaction information including, for example, purchased items, transaction sizes, etc.). In some embodiments, the system provider device may generate a plurality of financial instrument bundles that each include one or more funding instruments, generate financial instrument bundle presentation information for those financial instrument bundles. The system provider device may then send the financial instrument bundle presentation information for display on the merchant device 202 so that the customer may select a financial instrument bundle for making the payment.

Figure 9A:
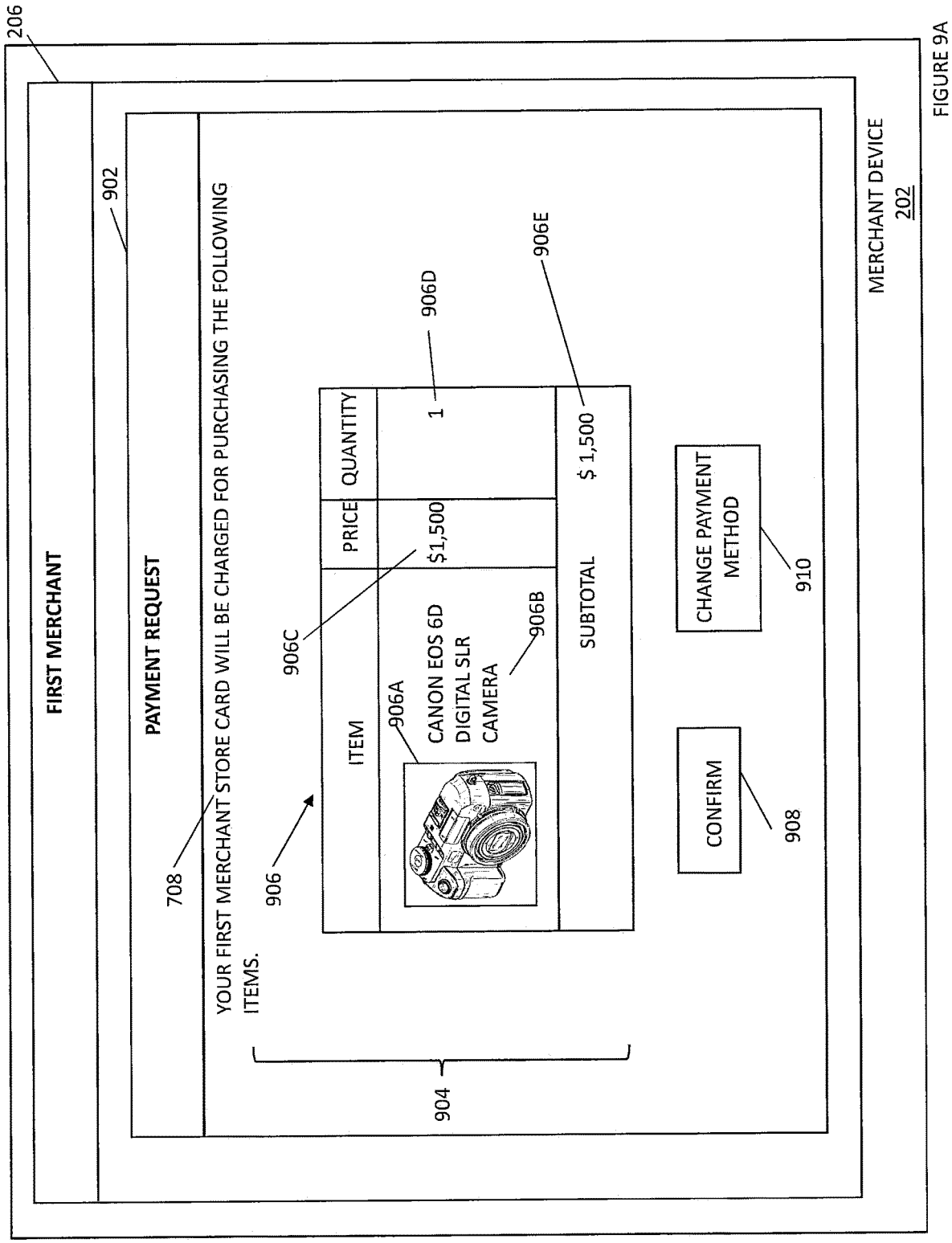
FIG. 9A illustrates an embodiment of a merchant device displaying a payment request screen.

The method 100 may then proceed to block 114 where the system provider device may generate a payment request that includes the payment funding instrument(s) for performing a payment transaction. Referring now to FIG. 9A, an embodiment is illustrated of the merchant device 202 that includes a display subsystem 206 displaying a payment request screen 902. The payment request screen 902 includes a payment request 904 including the funding instrument information (e.g., "FIRST MERCHANT STORE CARD") for the funding instrument 708 selected by the customer, and item information 906 associated with item(s) that the customer is purchasing from the first merchant. The item information 906 may include an item image 906A (e.g., an image of the item(s) to purchase), item details 906B (e.g., "Canon EOS 6D Digital SLR Camera"), price information 906C (e.g., "$1,500"), item quantity 906D (e.g., "1"), subtotal information 906E (e.g., "$1,500"), and/or other item information known in the art. In an example, the customer may select the confirm button 908 to send the payment request 904 to the system provider device 400. In another example, the customer may select the change payment method button 910 to change the payment funding instrument (e.g., by swiping a new credit card using a card reader of the merchant device).

Figure 9B:
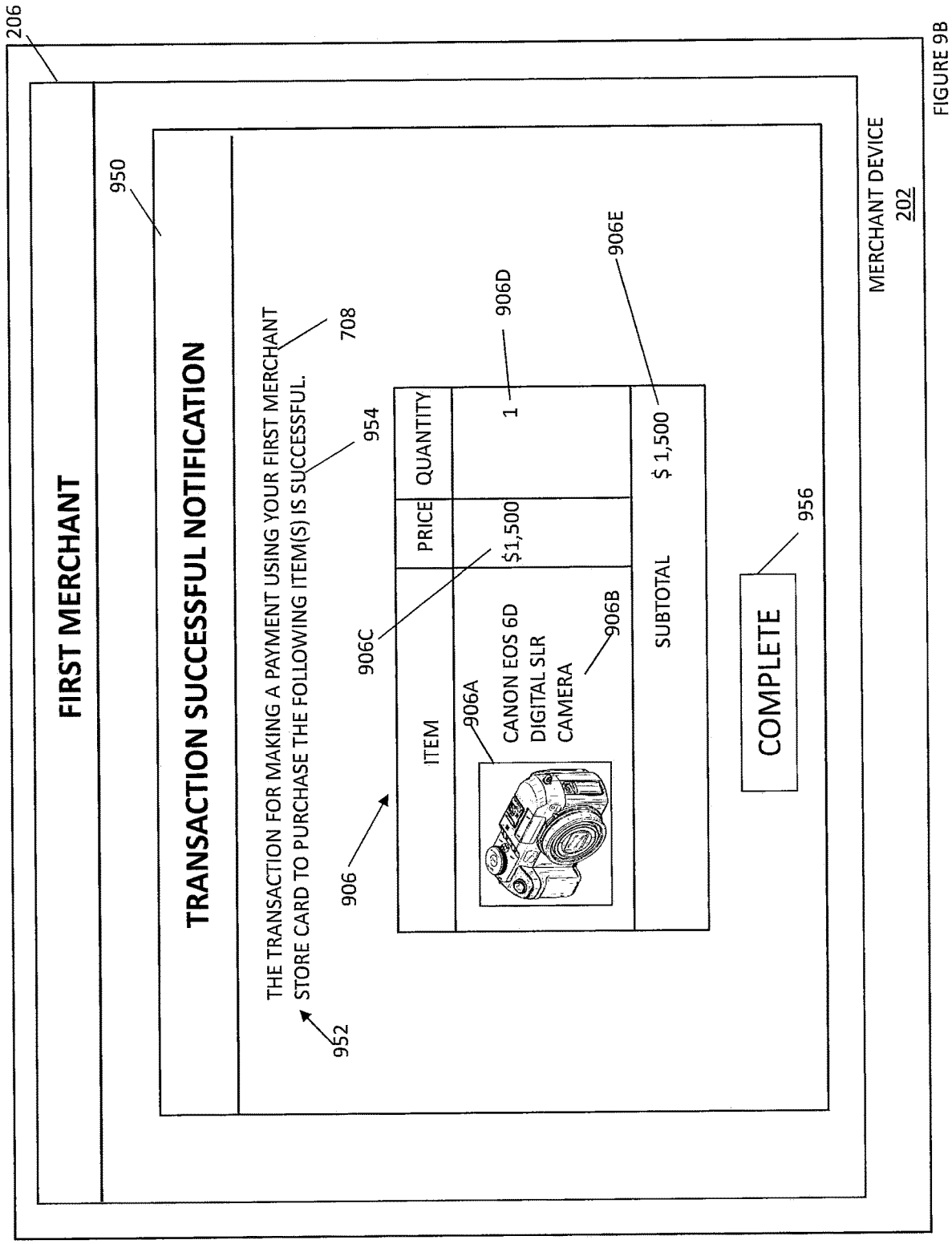
FIG. 9B illustrates an embodiment of a merchant device displaying a transaction completed notification screen.

The method 100 may then proceed to block 116 where the system provider device may send the payment request to the payment service provider to process the payment request, and complete the transaction. Referring now to FIG. 9B, after the payment service provider completes the payment transaction requested by the payment request 904, the system provider device may send a transaction successful notification 952 to the merchant device 202. FIG. 9B illustrates an embodiment of the merchant device 202 including the display subsystem 206 displaying a transaction successful notification screen 950 that includes a transaction successful notification 952 having the purchased item information 906, the transaction amount 906E, and a transaction status 954 (e.g., "SUCCESSFUL"). In some examples, after the transaction is completed (e.g., after the customer selects the complete button 956, after an operator of the merchant device 202 selects a predefined button indicating that the transaction is completed, or after a predefined time period), the merchant device 202 performs a cleaning process to erase information (e.g., funding instrument presentation information, user device information, and/or other information that was obtained by the merchant device 202 during the method 100) that is associated with customer.

In some embodiments, the checkout process at the POS device included in the merchant device at a merchant physical location may be simplified for a customer after the system provider device determines that the customer had previously completed a transaction at that merchant physical location (e.g., based on the customer's transaction history at the merchant physical location). For example, the merchant device may capture biometric characteristic(s) (e.g., a fingerprint, a voice, a face image, etc.) of the customer, and send the captured biometric characteristic(s) to the system provider device. In those examples, the system provider device may use the captured biometric characteristic(s) to identify the customer, and authenticate the customer with a payment account provided by a payment service provider. The system provider device may also automatically determine a default funding instrument (e.g., based on the funding instrument used in the customer's last transaction at that merchant physical location), and send a payment request to the payment service provider to make a payment for the present transaction at the POS device.

It is noted that while the check out activities at the POS devices included in the merchant devices at the merchant physical locations are used in the examples above to describe the identification and authentication system, those examples are not meant to be limiting. In other embodiments, a user may use the identification and authentication system to utilize their customer mobile device to perform other activities (e.g., digital ticketing activities, library checkout activities, etc.) requiring a public device at a public location (e.g., a ticketing device at a stadium, a library computer at a library, etc.) without that the need to remove their mobile customer device from a pocket or bag.

In a specific example, a user may provide identification information and/or authorization information on a ticket checking device at an entrance of a stadium. A user mobile device carried by the user may be automatically identified using the identification information, which allows for the receipt of authentication information and authentication of the user with a digital ticketing account at a digital ticketing service provider (e.g., Flash Seats® available from AXS.com of Los Angeles, Calif.) in the manner described above. As such, the user may gain access to an event (e.g., concerts, sporting events, etc.) at the stadium after a digital ticket for that event in a digital ticketing account is verified, without the need to remove the user mobile device from a pocket or bag and without the need to perform any affirmative activities on that user mobile device.

In another specific example, a user may provide identification information and/or authorization information to a library checkout station at a library. A user mobile device carried by the user may be automatically identified using the identification information, which allows for the receipt of authentication information and authentication of the user with a library account at the library in the manner described above. As such, the user may check out books at the library with the assistance of the user's mobile device without the need to remove the user mobile device from a pocket or bag and without the need to perform any affirmative activities on that mobile device.

Thus, systems and methods have been described that provide customers/users, merchants, system providers, payment service providers, and various third-party service providers a location-based identification and authentication system that identifies a customer mobile device at a merchant physical location and uses the identified customer mobile device to enable a payment transaction at the merchant physical location. A plurality of customer mobile devices in proximity of a POS device included in the merchant device may be automatically detected (e.g., by a system provider device and/or the merchant device), and a particular customer mobile device may be identified based on customer mobile device identification information that is provided by the customer through the merchant device. The identified customer device may be used to authenticate the use of a payment account of the customer with a payment service provider based on authentication information that is provided by the customer through the merchant device. As such, the customer may make an electronic payment for a payment transaction at the POS device with the need to interact with the identified customer mobile device or event remove that customer mobile device from a pocket or bag, which may save time and improve the user experience at the POS device. In embodiments where the payment account of the customer includes multiple funding instruments, funding instrument presentation information may be sent to the merchant device and provided for display on the merchant device, which allows the customer to select a funding instrument for performing the payment transaction at the POS device. Such funding instrument presentation information may be generated based on a funding instrument presentation configuration for the merchant physical location, which may be configured to enable the customer to use the merchant device to select the funding instrument for performing the payment transaction without sending or displaying any sensitive information about the customer and/or the funding instrument to the merchant device, thereby achieving improved security and privacy.

Figure 10:
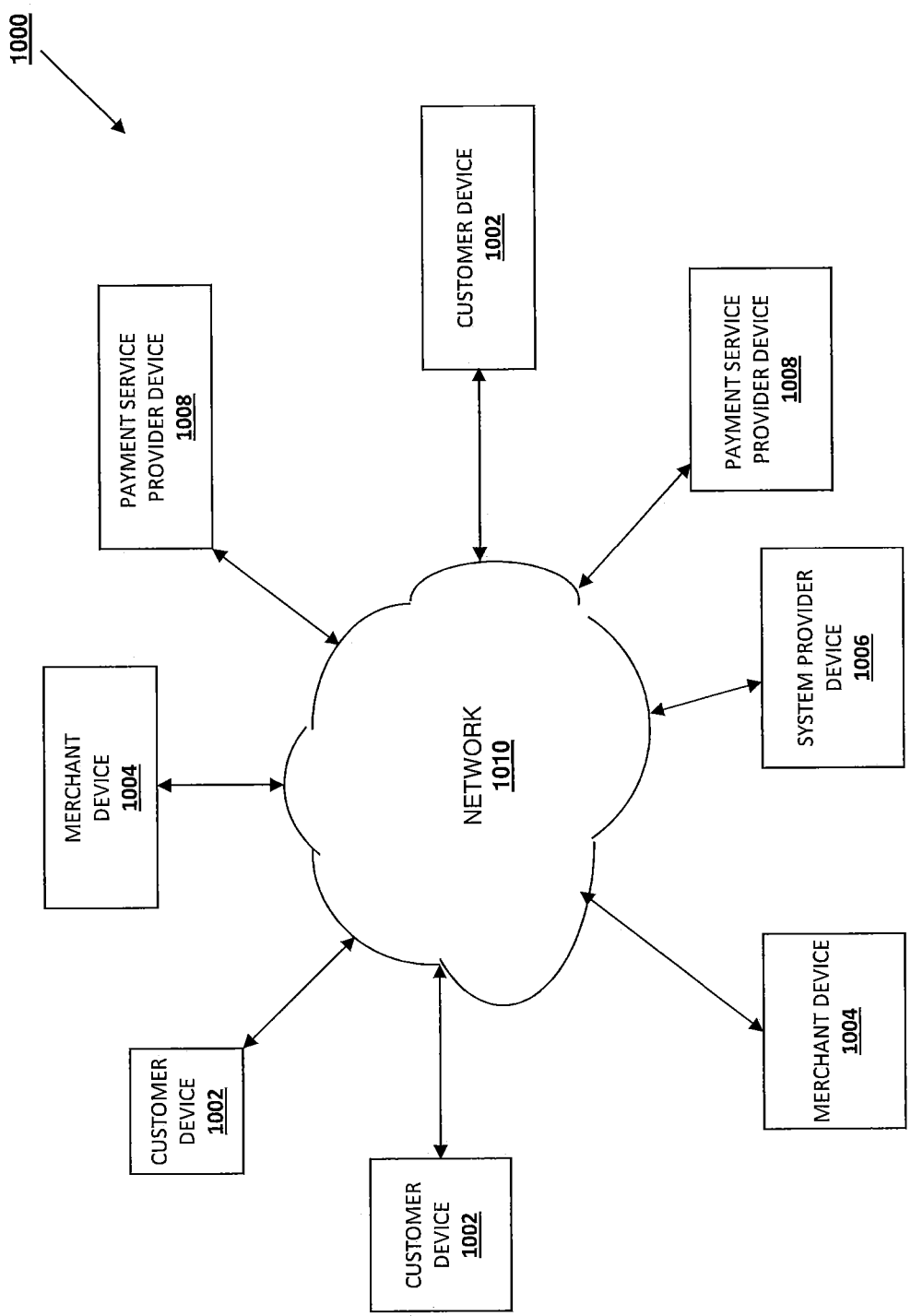
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes one or more customer devices 1002, one or more merchant devices 1004, one or more system provider devices 1006, and one or more payment service provider device 1008 in communication over a network 1010. Any of the customer devices 1002 may be the customer mobile device 212 discussed above and used by the user discussed above. The system provider device 1006 may be the system provider device 400 discussed above and may be operated by a system provider such as, for example, PayPal Inc. of San Jose, Calif. The payment service provider device 1008 may be the service provider device discussed above and may be operated by various service providers including payment service providers, education service providers, digital ticketing providers, and/or other service providers.

The customer devices 1002, merchant devices 1004, system provider devices 1006, and payment service provider devices 1008 may each include one or more processors, memories, and other appropriate components for executing instructions such as program code and/or data stored on one or more computer readable mediums to implement the various applications, data, and steps described herein. For example, such instructions may be stored in one or more computer-readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The customer device 1002 may be implemented using any appropriate combination of hardware and/or software configured for wired and/or wireless communication over network 1010. For example, in one embodiment, the customer device 1002 may be implemented as a personal computer of a user in communication with the Internet. In some embodiments, the customer device 1002 may be a wearable device. In some embodiments, the customer device 1002 may be a smart phone, personal digital assistant (PDA), laptop computer, and/or other types of computing devices.

The customer device 1002 may include one or more browser applications which may be used, for example, to provide a convenient interface to permit the customer to browse information available over the network 1010. For example, in one embodiment, the browser application may be implemented as a web browser configured to view information available over the Internet.

The customer device 1002 may also include one or more toolbar applications which may be used, for example, to provide user-side processing for performing desired tasks in response to operations selected by the customer. In one embodiment, the toolbar application may display a user interface in connection with the browser application.

The customer device 1002 may further include other applications as may be desired in particular embodiments to provide desired features to the customer device 1002. In particular, the other applications may include a location-based device and payment management application provided by a system provider through the system provider device 1006. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 1010. The customer device 1002 includes one or more user and/or device identifiers which may be implemented, for example, as operating system registry entries, cookies associated with the browser application, identifiers associated with hardware of the customer device 1002, or other appropriate identifiers, such as a phone number. In one embodiment, the user identifier may be used by the merchant device 1004, the system provider device 1006, and/or the payment service provider device 1008 to associate the user with a particular account as further described herein.

Figure 11:
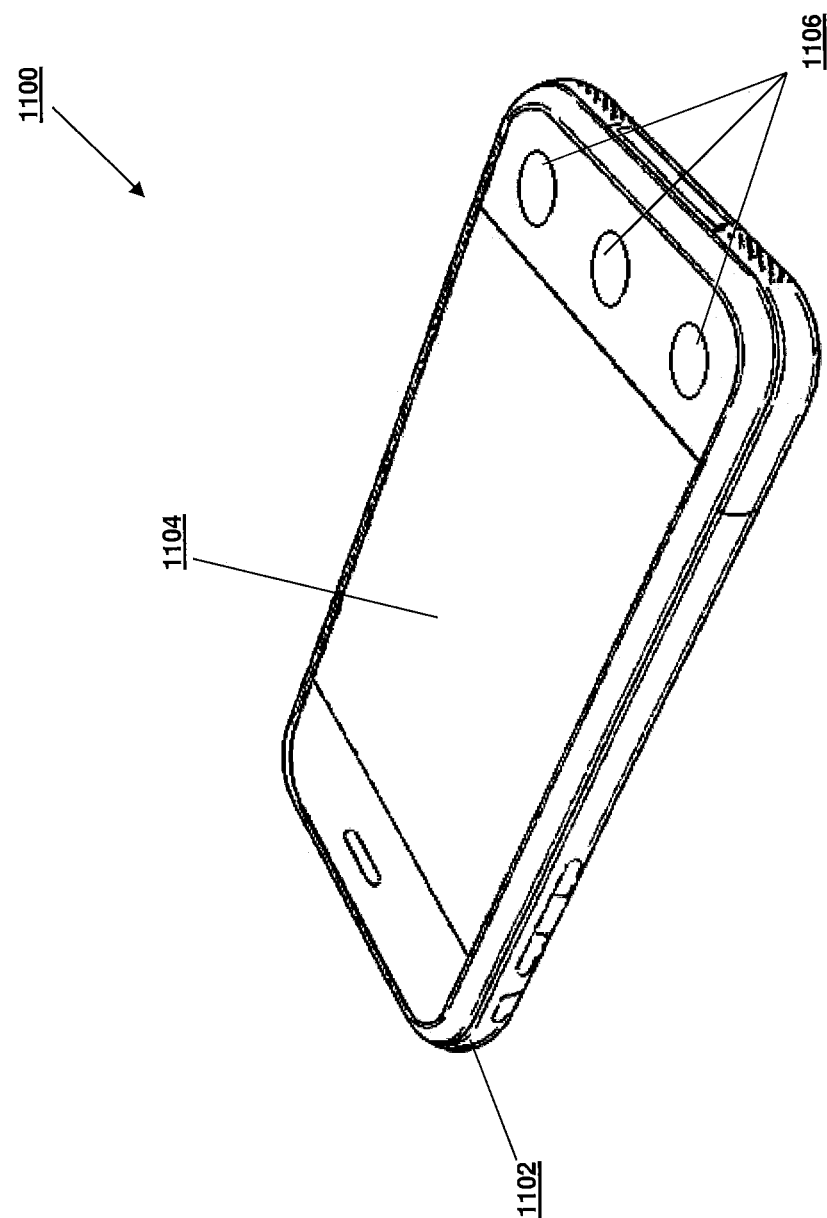
FIG. 11 is a perspective view illustrating an embodiment of a customer device.

Referring now to FIG. 11, an embodiment of a customer device 1100 is illustrated. The customer device 1100 may be the customer mobile device 212. The customer device 1100 includes a chassis 1102 having a display 1104 and an input device including the display 1104 and a plurality of input buttons 1106. One of skill in the art will recognize that the customer device 1100 is a portable or mobile phone including a touch screen input device and a plurality of input buttons that allow the functionality discussed above with reference to the method 100. However, a variety of other portable/mobile customer devices may be used in the method 100 without departing from the scope of the present disclosure.

Figure 12:
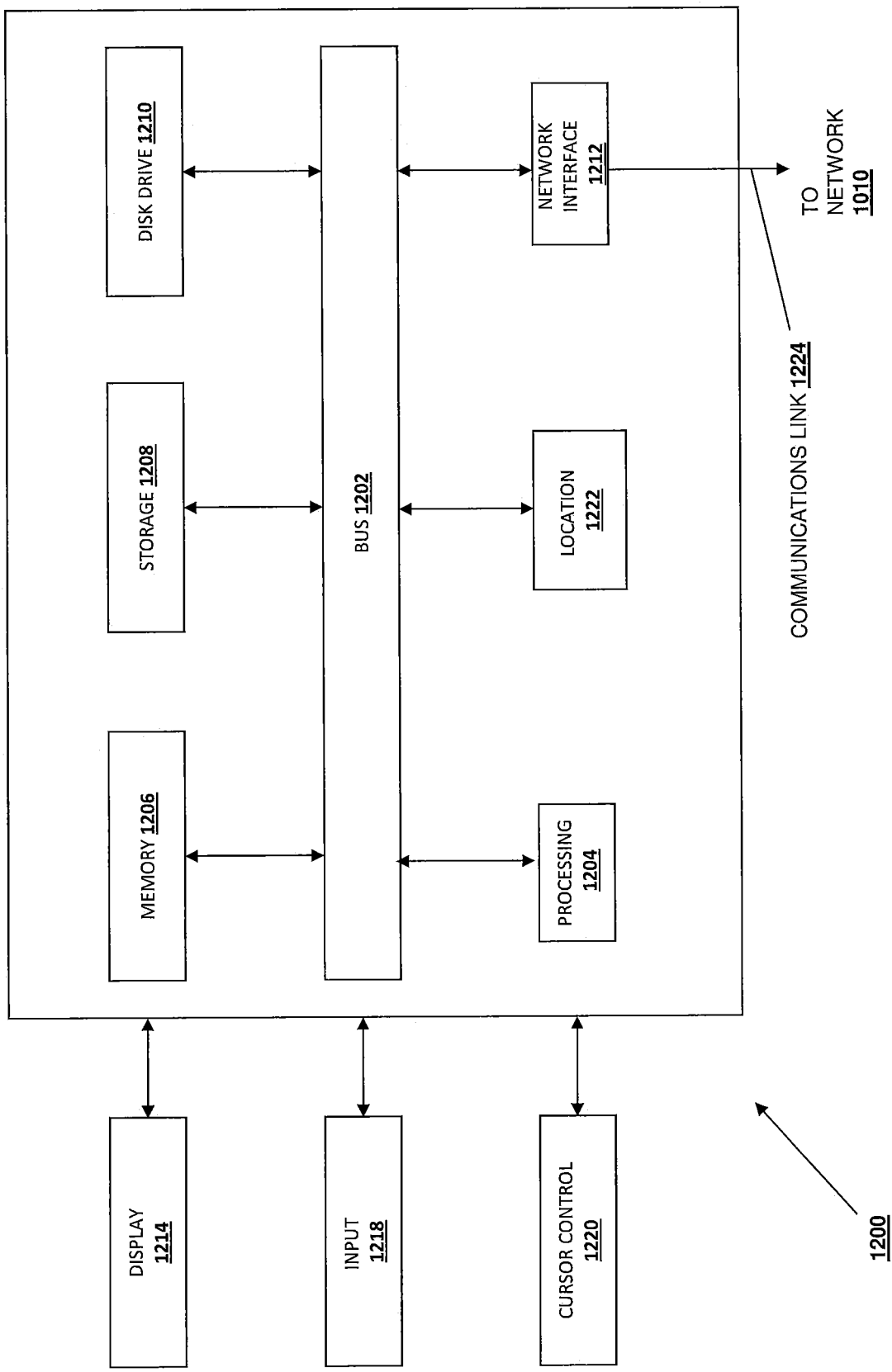
FIG. 12 is a schematic view illustrating an embodiment of a computer system.

Referring now to FIG. 12, an embodiment of a computer system 1200 suitable for implementing, for example, the merchant device 202, the customer mobile device 212, the system provider device 400, customer devices 1002, merchant devices 1004, system provider devices 1006, and payment service provider devices 1008, is illustrated. It should be appreciated that other devices utilized by users, payment service providers, other third party service providers, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., LED, LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the merchant device 202, the customer mobile device 212, the system provider device 400, customer devices 1002, merchant devices 1004, system provider devices 1006, and payment service provider devices 1008. Such instructions may be read into the system memory component 1206 from another computer-readable medium, such as the static storage component 1208 or the disk drive component 1210. In other embodiments, hard-wired circuitry may be used in place of or in combination with software instructions to implement the present disclosure.

Logic may be encoded in a computer-readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
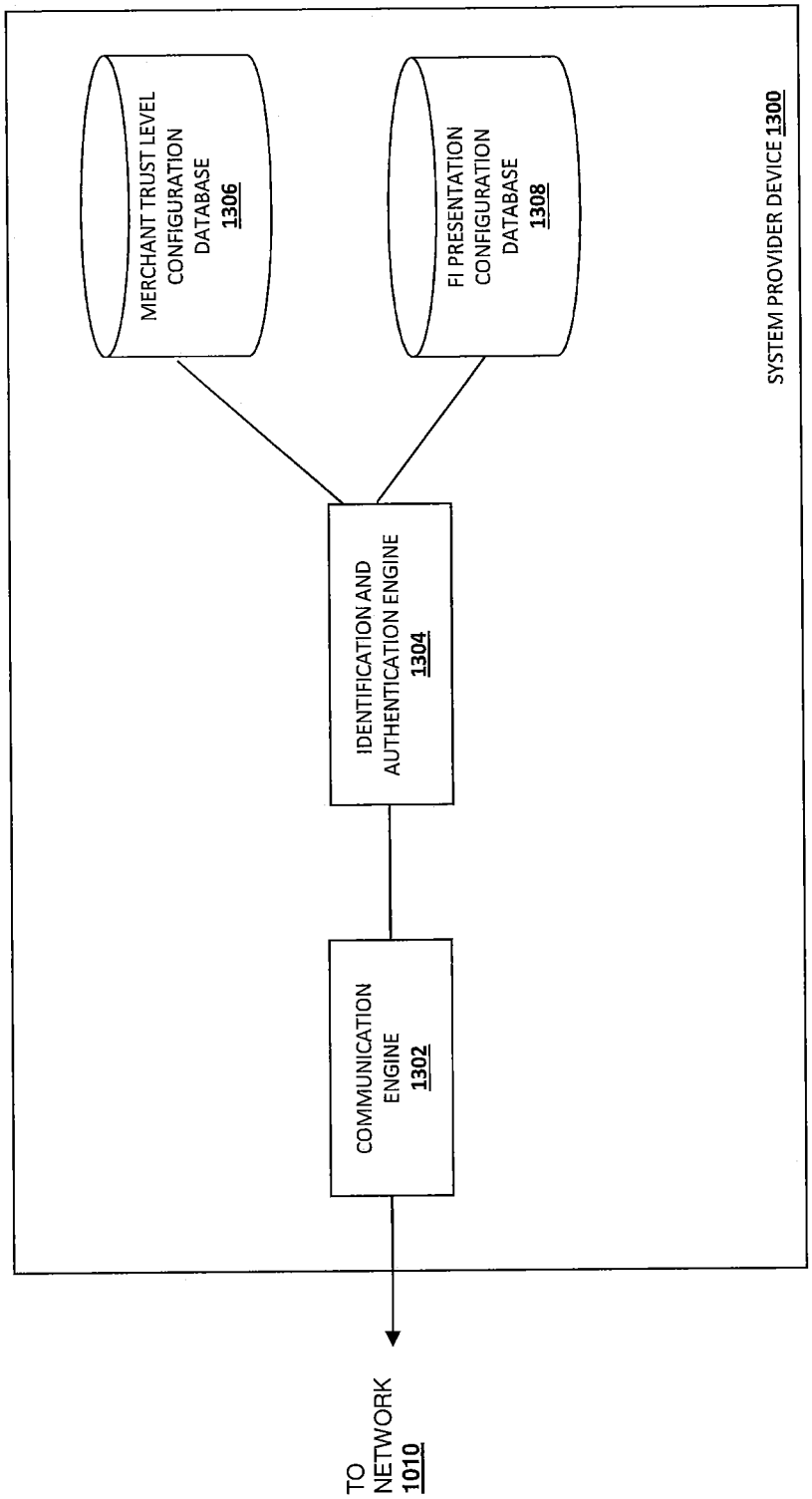
FIG. 13 is a schematic view illustrating an embodiment of a system provider device.

Referring now to FIG. 13, an embodiment of a system provider device 1300 is illustrated. In an embodiment, the system provider device 1300 may be the system provider devices 400 discussed above. The system provider device 1300 includes a communication engine 1302 that is coupled to the network 1010 and to an identification and authentication engine 1304 that is coupled to a merchant trust level configuration database 1306 and a funding instrument presentation configuration database 1308. The communication engine 1302 may be software or instructions stored on a computer-readable medium that allows the system provider device 1300 to send and receive information over the network 1010. The identification and authentication engine 1304 may be software or instructions stored on a computer-readable medium that is operable to identify a user device that is associated with a user at a merchant physical location based on user device identification information that is provided by the user through a merchant device that is located at the merchant physical location, authenticate, using the identified user device, a payment account of the user at a payment service provider based on authentication information that is provided by the user through the merchant device, send funding instrument presentation information that identifies a plurality of funding instruments that is included in the payment account for display on the merchant device, receive funding instrument selection information that indicates that a particular funding instrument is selected by the user to perform a payment transaction and in response, send a payment request that includes that particular funding instrument to the payment service provider, and provide any of the other functionality that is discussed above. While the databases 1306-1308 have been illustrated as separate from each other and located in the system provider device 1300, one of skill in the art will recognize that any or all of the databases 1306-1308 may be combined and/or may be connected to the identification and authentication 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    one or more processors and one or more computer-readable memories, with program instructions stored on the one or more computer-readable memories, the one or more processors configured to execute the program instructions to cause the system to perform operations comprising:
        in response to detecting a first user device is within a threshold distance of a merchant device of a merchant, generating a customer identification information and sending the customer identification information to the first user device;
        providing, via a user interface of the merchant device, a request for input of the customer identification information;
        in response to receiving, via an input into the user interface of the merchant device, the customer identification information, determining that the customer identification information corresponds to the first user device;
        in response to determining that the customer identification information corresponds to the first user device, providing an authentication request to a user of the user device;
        in response to authenticating the user based on authentication information received in response to the authentication request, determining a user account associated with the user and determining one or more funding instruments associated with the user account;
        providing, via the user interface of the merchant device, one or more selectable elements corresponding to the determined one or more funding instruments;
        receiving, via the user interface of the merchant device, a selection of a first selectable element of the one or more elements; and
        in response to receiving the selection of the first selectable element, processing a transaction using a funding instrument of the one or more funding instruments that corresponds to the first selectable element.

2. The system of claim 1, wherein the detecting that the first user device is within the threshold distance of the merchant device is based on determining that the merchant device has established a short range wireless connection with the first device.

3. The system of claim 1, wherein the authentication information is received from the first user device.

4. The system of claim 1, wherein the authentication information is received via input into the user interface of the merchant device in response to the authentication request being displayed on the merchant device.

5. The system of claim 1, wherein the authentication request provided to the user is a request for a first type of authentication based on a determined merchant trust level associated with the merchant.

6. The system of claim 1, wherein the authentication request provided to the user is a request for a first type of authentication information based on a determined merchant trust level associated with the merchant.

7. The system of claim 1, wherein the one or more selectable elements do not include identification information corresponding to the one or more funding instruments.

8. A method comprising:
    in response to detecting a first user device is within a threshold distance of a merchant device of a merchant, generating a customer identification information and sending the customer identification information to the first user device;
    providing, via a user interface of the merchant device, a request for input of the customer identification information;
    in response to receiving, via an input into the user interface of the merchant device, the customer identification information, determining that the customer identification information corresponds to the first user device;

in response to determining that the customer identification information corresponds to the first user device, providing an authentication request to a user of the user device;

in response to authenticating the user based on authentication information received in response to the authentication request, determining a user account associated with the user and determining one or more funding instruments associated with the user account;

providing, via the user interface of the merchant device, one or more selectable elements corresponding to the determined one or more funding instruments;

receiving, via the user interface of the merchant device, a selection of a first selectable element of the one or more elements; and in response to receiving the selection of the first selectable element, processing a transaction using a funding instrument of the one or more funding instruments that corresponds to the first selectable element.

9. The method of claim 8, wherein the detecting that the first user device is within the threshold distance of the merchant device is based on determining that the merchant device has established a short range wireless connection with the first device.

10. The method of claim 8, wherein the authentication information is received from the first user device.

11. The method of claim 8, wherein the authentication information is received via input into the user interface of the merchant device in response to the authentication request being displayed on the merchant device.

12. The method of claim 8, wherein the authentication request provided to the user is a request for a first type of authentication based on a determined merchant trust level associated with the merchant.

13. The method of claim 8, wherein the authentication request provided to the user is a request for a first type of authentication information based on a determined merchant trust level associated with the merchant.

14. The method of claim 8, wherein the one or more selectable elements do not include identification information corresponding to the one or more funding instruments.

15. A computer program product comprising:

one or more computer-readable tangible storage devices, and program instructions stored on at least one of the one or more computer-readable tangible storage devices, the program instructions when executed cause a machine to perform operations comprising:

in response to detecting a first user device is within a threshold distance of a merchant device of a merchant, generating a customer identification information and sending the customer identification information to the first user device;

providing, via a user interface of the merchant device, a request for input of the customer identification information;

in response to receiving, via an input into the user interface of the merchant device, the customer identification information, determining that the customer identification information corresponds to the first user device;

in response to determining that the customer identification information corresponds to the first user device, providing an authentication request to a user of the user device;

in response to authenticating the user based on authentication information received in response to the authentication request, determining a user account associated with the user and determining one or more funding instruments associated with the user account;

providing, via the user interface of the merchant device, one or more selectable elements corresponding to the determined one or more funding instruments;

receiving, via the user interface of the merchant device, a selection of a first selectable element of the one or more elements; and in response to receiving the selection of the first selectable element, processing a transaction using a funding instrument of the one or more funding instruments that corresponds to the first selectable element.

16. The computer program product of claim 15, wherein the detecting that the first user device is within the threshold distance of the merchant device is based on determining that the merchant device has established a short range wireless connection with the first device.

17. The computer program product of claim 15, wherein the authentication information is received from the first user device.

18. The computer program product of claim 15, wherein the authentication information is received via input into the user interface of the merchant device in response to the authentication request being displayed on the merchant device.

19. The computer program product of claim 15, wherein the authentication request provided to the user is a request for a first type of authentication based on a determined merchant trust level associated with the merchant.

20. The computer program product of claim 15, wherein the one or more selectable elements do not include identification information corresponding to the one or more funding instruments.

* * * * *